(12) United States Patent
Taira et al.

(10) Patent No.: US 10,563,282 B2
(45) Date of Patent: Feb. 18, 2020

(54) INDUCTION HEATING DEVICE FOR METAL STRIP

(71) Applicant: NIPPON STEEL & SUMITOMO METAL CORPORATION, Tokyo (JP)

(72) Inventors: Masato Taira, Tokyo (JP); Yoshiaki Hirota, Tokyo (JP); Takeo Itoh, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 207 days.

(21) Appl. No.: 15/503,948

(22) PCT Filed: Sep. 3, 2015

(86) PCT No.: PCT/JP2015/075133
§ 371 (c)(1),
(2) Date: Feb. 14, 2017

(87) PCT Pub. No.: WO2016/035867
PCT Pub. Date: Mar. 10, 2016

(65) Prior Publication Data
US 2017/0260604 A1    Sep. 14, 2017

(30) Foreign Application Priority Data

Sep. 3, 2014  (JP) ................................. 2014-179664
Sep. 5, 2014  (JP) ................................. 2014-181692

(51) Int. Cl.
*C21D 9/60*    (2006.01)
*C21D 1/42*    (2006.01)
(Continued)

(52) U.S. Cl.
CPC ............... *C21D 9/60* (2013.01); *C21D 1/00* (2013.01); *C21D 1/42* (2013.01); *F27B 9/067* (2013.01);
(Continued)

(58) Field of Classification Search
CPC . H05B 6/101; H05B 6/36; H05B 6/44; C21D 9/60
See application file for complete search history.

(56) References Cited

U.S. PATENT DOCUMENTS 4,585,916 A *  4/1986 Rich ........................ C21D 9/60
                                                        219/388
6,180,933 B1 * 1/2001 Demidovitch ......... H05B 6/067
                                                        219/645
(Continued)

FOREIGN PATENT DOCUMENTS

EP    2157193 A1   2/2010
JP    8-153577 A   2/1988
(Continued)

OTHER PUBLICATIONS

Extended European Search Report dated Mar. 8, 2018, for corresponding European Application No. 15838082.4.
(Continued)

*Primary Examiner* — Ibrahime A Abraham
*Assistant Examiner* — Ahmad Abdel-Rahman
(74) *Attorney, Agent, or Firm* — Birch, Stewart, Kolasch & Birch, LLP

(57) ABSTRACT

An induction heating device for a metal strip, including: an induction coil provided on one side or on both sides of a front face side or a reverse face side of a metal strip, and that induces an induction current in the strip when a primary current is passed through the coil, the induction current configuring a closed loop as viewed from a direction perpendicular to a metal strip face; plural magnetic cores disposed at a specific position, this being a position at a back face side of the coil and separated from the strip by a specific distance, to concentrate magnetic flux generated by the coil in the strip; and a moving mechanism coupled to the magnetic cores, and that moves the cores to increase or
(Continued)

decrease a disposed number of the cores at the specific position disposed side-by-side along a metal strip width direction.

8 Claims, 18 Drawing Sheets

(51) Int. Cl.

| | | |
|---|---|---|
| H05B 6/08 | (2006.01) | |
| H05B 6/10 | (2006.01) | |
| H05B 6/40 | (2006.01) | |
| H05B 6/44 | (2006.01) | |
| F27D 11/06 | (2006.01) | |
| F27B 9/36 | (2006.01) | |
| H05B 6/36 | (2006.01) | |
| C21D 1/00 | (2006.01) | |
| F27B 9/06 | (2006.01) | |
| F27B 9/28 | (2006.01) | |
| F27D 19/00 | (2006.01) | |

(52) U.S. Cl.
CPC ............... *F27B 9/28* (2013.01); *F27B 9/36* (2013.01); *F27D 11/06* (2013.01); *F27D 19/00* (2013.01); *H05B 6/08* (2013.01); *H05B 6/10* (2013.01); *H05B 6/101* (2013.01); *H05B 6/36* (2013.01); *H05B 6/40* (2013.01); *H05B 6/44* (2013.01); *F27D 2019/0003* (2013.01); *F27D 2019/0034* (2013.01); *F27D 2019/0071* (2013.01); *Y02P 10/253* (2015.11)

(56) References Cited

U.S. PATENT DOCUMENTS

| | | | | |
|---|---|---|---|---|
| 6,608,290 B1* | 8/2003 | Robinson | ............... | C21D 9/60 219/645 |
| 2002/0011486 A1* | 1/2002 | Anderhuber | ........... | H05B 6/104 219/645 |
| 2007/0235446 A1 | 10/2007 | Cao et al. | | |
| 2008/0264932 A1 | 10/2008 | Hirota | | |
| 2010/0072192 A1 | 3/2010 | Hirota | | |
| 2010/0108665 A1* | 5/2010 | Hirota | ..................... | C21D 1/10 219/600 |

FOREIGN PATENT DOCUMENTS

| | | |
|---|---|---|
| JP | 63-27836 A | 2/1988 |
| JP | 11-500262 A | 1/1999 |
| JP | 2001-32016 A | 2/2001 |
| JP | 2001-160481 A | 6/2001 |
| JP | 2002-8838 A | 1/2002 |
| JP | 2002-151245 A | 5/2002 |
| JP | 2004-296368 A | 10/2004 |
| JP | 2006-294396 A | 10/2006 |
| JP | 2007-95651 A | 10/2006 |
| JP | 2008-204648 A | 9/2008 |
| JP | 2008 288200 A | 11/2008 |
| JP | 2009-259588 A | 11/2009 |
| JP | 2012-195316 A | 10/2012 |
| WO | WO 96/26296 A1 | 8/1996 |

OTHER PUBLICATIONS

International Preliminary Report on patentability for PCT/JP2015/075133 (PCT/IPEA/409) dated Sep. 26, 2016.
International Search Report for PCT/JP2015/075133 dated Nov. 24, 2015.
Written Opinion of the International Searching Authority for PCT/JP2015/075133 (PCT/ISA/237) dated Nov. 24, 2015.

* cited by examiner

INDUCTION HEATING DEVICE FOR METAL STRIP

TECHNICAL FIELD

The present invention relates to an induction heating device for a metal strip.

BACKGROUND ART

When heating a metal strip in a heat treatment furnace, heating is generally performed indirectly using radiant tubes. In such indirect heating, thermal inertia is high, such that effective heat input to the metal strip becomes more difficult the smaller the difference between the temperature of the metal strip and the furnace temperature, resulting in productivity constraints. Moreover, in such indirect heating, it is difficult to achieve rapid heating in the vicinity of a transformation point at which a heat absorbing reaction occurs, and it is also difficult to achieve high temperature annealing due to constraints in the heat resistance of the radiant tubes. The degree of freedom when selecting heat treatment conditions for metal strips is therefore constrained.

By contrast, in induction heating, the metal strip is heated using high frequency current, and the heating speed and heating temperature can be freely controlled. Induction heating consequently offers a high degree of freedom in heat treatment operations and in the development of metal strip products, and is a heating method that has been garnering attention in recent years.

There are two main methods of induction heating. One method is a longitudinal magnetic flux (LF) heating method in which a high frequency current is passed through an induction coil surrounding the periphery of a metal strip, causing magnetic flux to penetrate a length direction (direction of progress) cross-section of the metal strip (a cross-section taken orthogonally to the length direction of the metal strip). This generates an induction current perpendicular to the magnetic flux and running in a loop within the length direction (direction of progress) cross-section of the metal strip, thereby heating the metal strip.

The other method is a transverse magnetic flux (TF) heating method in which inductors (strong magnets) wound with primary coils are placed on both sides of the metal strip, and current is passed through the primary coils to generate magnetic flux that penetrates a strip face of the metal strip via the inductors, generating an induction current in the strip face of the metal strip, and thereby heating the metal strip.

In LF induction heating, in which induction current runs in a loop within the length direction (direction of progress) cross-section of the metal strip, due to the relationship between the permeation depth δ of the current and the current frequency f ($\delta$ (mm)=$5.03 \times 10^5 \sqrt{(\rho/\mu r \cdot f)}$, wherein ρ (Ωm): specific resistance, μr: specific magnetic permeability, f: frequency (Hz)), if the permeation depths of induction currents generated at front and back faces of the metal strip are greater than the thickness of a steel sheet, the generated induction currents interfere with each other, with the result that induction current is not generated within the length direction (direction of progress) cross-section of the metal strip.

For example, in the case of non-magnetic metal strips, steel sheets that lose their magnetism on exceeding their Curie temperature, or the like, the current permeation depth δ becomes deep, and so induction current is not generated if the strip thickness of the metal strip is thin. Moreover, even in the case of magnetic metal strips, for example, if the strip thickness is too thin in comparison to the permeation depth, induction current is not generated within the length direction (direction of progress) cross-section of the metal strip when using the LF method.

By contrast, in TF induction heating, since the magnetic flux penetrates the sheet faces of the metal strip, the metal strip can be heated irrespective of the strip thickness, and whether or not the metal strip is magnetic or non-magnetic. However, there is an issue with TF induction heating in that overheating is liable to occur at ends of the metal strip (see, for example, Japanese Patent Application Laid-Open (JP-A) No. 2002-151245).

In normal TF induction heating, there is also an issue that it is difficult to adapt to changes in the strip width of the metal strip, since it is not easy to change the shape of the inductors facing the strip faces of the metal strip.

Accordingly, for example, Japanese Patent Application Publication (JP-B) No. S63-027836 describes an electromagnetic induction heater provided with magnetic pole segments that are disposed side-by-side in a width direction of a thin sheet so as to face the sheet faces of the thin sheet, and are capable of moving independently in a strip thickness direction of the thin sheet, and a movable shielding plate of a non-magnetic metal, that is capable of deployment in the sheet width direction of the thin sheet and that adjusts the magnetic field of the magnetic pole segments.

This electromagnetic induction heater is capable of adjusting the magnetic flux according to changes in the sheet width of the thin sheet. However, it is difficult to adjust the magnetic flux in the sheet width direction rapidly when there is a large change in the sheet width of the thin sheet.

Japanese National Phase Publication No. H11-500262 describes a transverse magnetic flux induction heating system provided with plural independent magnetic rods, and a variable width magnetic circuit capable of adapting to the strip width of a metal strip. However, in this induction heating system, induction coils are integrated together with the magnetic rods, and so it is difficult to adjust the magnetic flux in the strip width direction if the strip width of the metal strip exceeds the induction coils. Moreover, it is difficult to adjust the magnetic flux in the strip width direction if the strip width of the metal strip is less than the sum of the width of the magnetic rods.

Moreover, JP-A No. 2002-8838 describes an induction heating device including plural magnetic rods. In this induction heating device, the plural magnetic rods are configured so as to be capable of moving in the strip width direction of a metal strip. This thereby enables changes in the strip width dimension of the metal strip to be accommodated by adjusting the spacing of the plural magnetic rods. However, in this induction heating device, the number of the magnetic rods disposed facing the metal strip is fixed even when metal strips have different width dimensions. Metal strips with different width dimensions are accommodated solely by adjusting the spacing of the magnetic rods. The following issue is therefore conceivable. Namely, when heating a metal strip having a broad strip width, the number of the magnetic rods facing the metal strip is fixed, and when there is a large change in the strip width of the metal strip, the spacing of the magnetic rods becomes larger. In other words, a gap between the magnetic rods in the strip width direction of the metal strip becomes larger. Since no magnetic rods are disposed in this gap area, there is a tendency for the heating temperature to decrease at a portion of the metal strip corresponding to the gap. As a result, there is a possibility of the heating temperature becoming uneven in the strip width direction of the metal strip.

SUMMARY OF INVENTION

Technical Problem

In consideration of the above circumstances, an object of the present invention is to provide an induction heating device for a metal strip that is capable of achieving a uniform heating temperature in a strip width direction of a metal strip, even when there is a large change in the strip width of the metal strip.

Solution to Problem

An induction heating device of the present disclosure includes: an induction coil that is provided on one strip thickness direction side or on both strip thickness direction sides of a metal strip that travels along a length direction thereof, and that induces an induction current in the metal strip when a primary current is passed through the induction coil, the induction current configuring a closed loop as viewed from the strip thickness direction of the metal strip; plural magnetic cores that face the metal strip in the strip thickness direction and that are disposed at a specific position separated from the metal strip by a specific distance so as to concentrate magnetic flux generated by the induction coil; and a moving mechanism that is coupled to the magnetic cores, and that moves the magnetic cores so as to increase or decrease a disposed number of the magnetic cores at the specific position disposed side-by-side along a strip width direction of the metal strip.

In the metal strip induction heating device configured as described above, the induction coil is provided on one strip thickness direction side or on both strip thickness direction sides of the metal strip that travels along its length direction. The induction current configuring a closed loop as viewed from the strip thickness direction of the metal strip is induced in the metal strip when the primary current is passed through the induction coil.

The magnetic cores are disposed facing the metal strip in the strip thickness direction, and are the magnetic cores are disposed at the specific position separated from the metal strip by a specific distance, such that magnetic flux generated by the induction coil is concentrated by the magnetic cores.

Note that the moving mechanism is coupled to the magnetic cores. The moving mechanism moves the magnetic cores so as to increase or decrease the disposed number of the magnetic cores at the specific position disposed side-by-side along the strip width direction of the metal strip.

Accordingly, when continuously heating the metal strip by induction heating, a number of the magnetic cores corresponding to the strip width of the metal strip can be disposed at the specific position even if the strip width of the metal strip changes. Namely, when heating a metal strip having a broad strip width, the disposed number of the magnetic cores disposed at the specific position can be increased in comparison to when heating a metal strip having a narrow strip width. Accordingly, the spacing in the strip width direction of the metal strip of the magnetic cores disposed at the specific position can be suppressed from becoming large, even when heating a metal strip having a broad strip width. This thereby enables a more uniform heating temperature to be achieved over the strip width direction of the metal strip.

Advantageous Effects of Invention

The induction heating device for a metal strip of the present disclosure enables a uniform heating temperature to be achieved over the strip width direction of the metal strip, even when there is a large change in the strip width of the metal strip.

DESCRIPTION OF EMBODIMENTS

First Exemplary Embodiment

Figure 1:
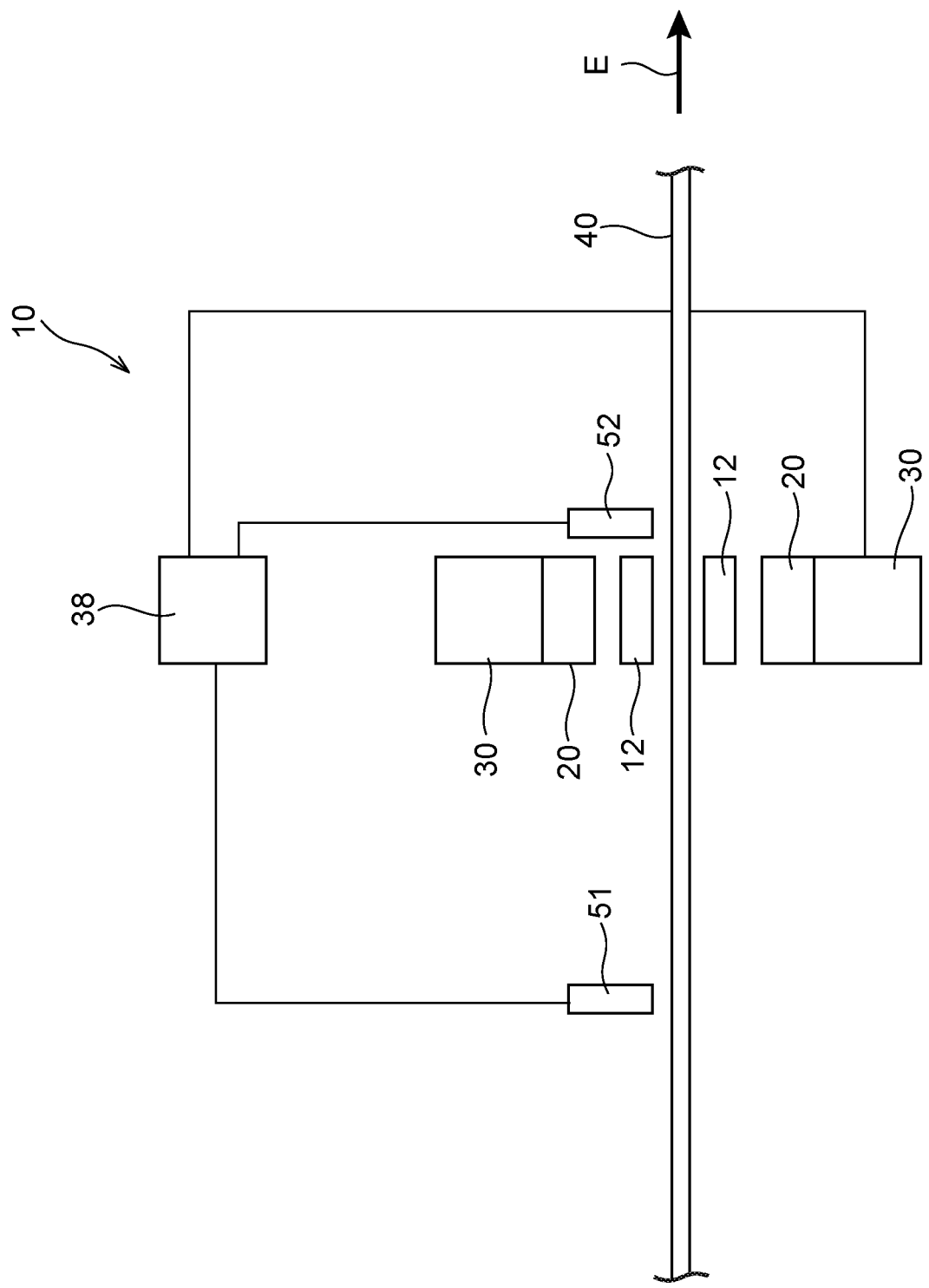
FIG. 1 is a schematic side view as viewed from one strip width direction side of a metal strip, and illustrates relevant portions of a metal strip induction heating device according to a first exemplary embodiment.
Figure 2:
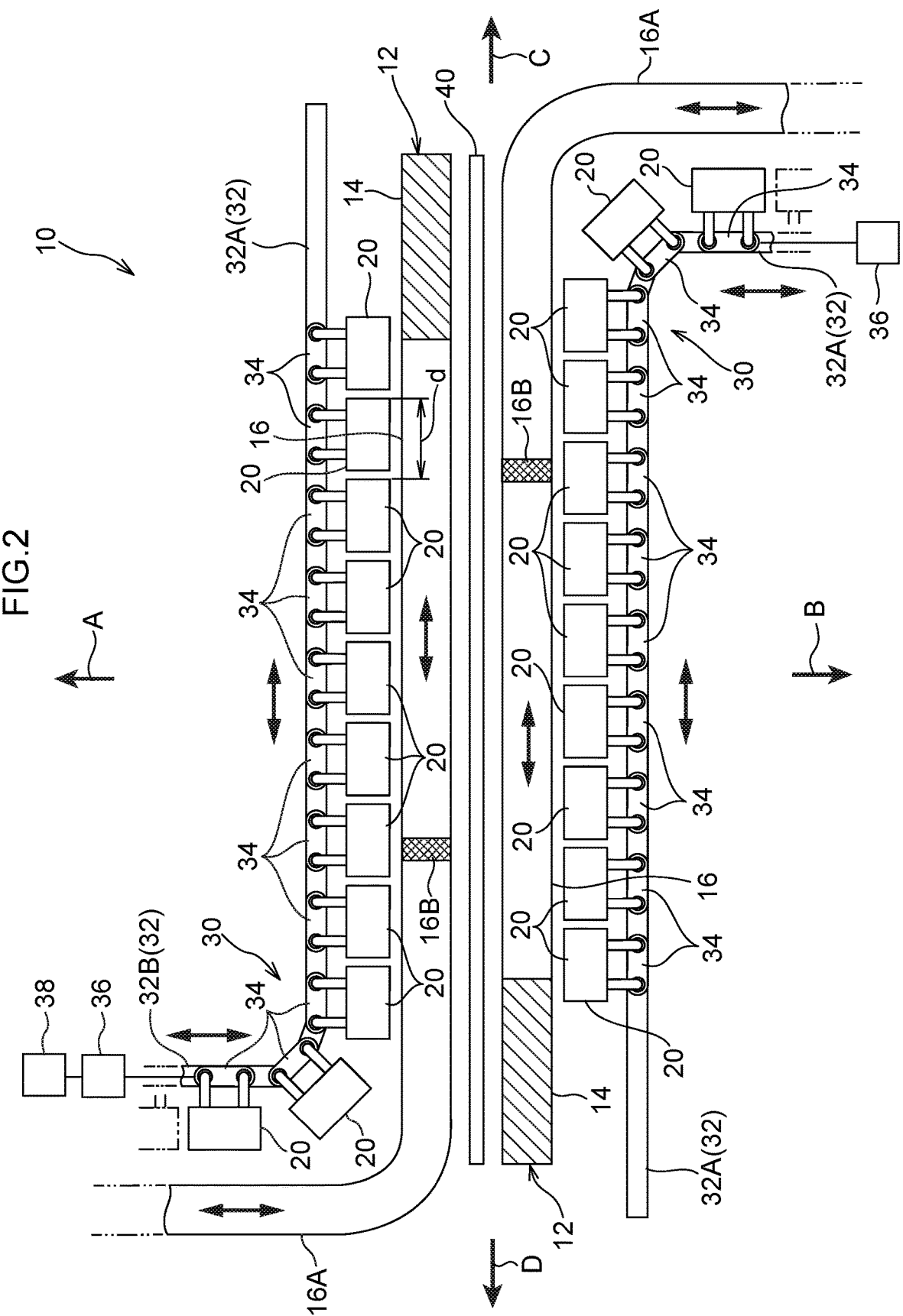
FIG. 2 is a schematic front view as viewed from the length direction of a metal strip, and illustrates relevant portions of the metal strip induction heating device illustrated in FIG. 1.

Explanation follows regarding a metal strip induction heating device 10 (referred to below as simply the "induction heating device 10") according to a first exemplary embodiment of the present invention, with reference to FIG. 1 to FIG. 6. As illustrated in FIG. 1 and FIG. 2, the induction heating device 10 is configured including a pair of induction coils 12 for heating a metal strip 40, plural magnetic cores 20, a pair of moving mechanisms 30 for moving the magnetic cores 20, a strip width/edge position detector 51 (see FIG. 1) that detects the profile of the metal strip 40 in a strip width direction, a temperature distribution detector 52 that detects a temperature distribution of the metal strip 40, and a controller 38 (see FIG. 1) that controls the moving mechanisms 30 based on a signal from at least one of the strip width/edge position detector 51 or the temperature distribution detector 52. Detection of the strip width direction profile by the strip width/edge position detector 51 is, for example, performed by using an image detection device to detect the positions of both edges of the metal strip 40 in the strip width direction. The strip width/edge position detector 51 is thus able to detect the strip width, and meandering, of the metal strip 40 by detecting the positions of the two strip width direction edges of the metal strip 40. Detection of the temperature distribution by the temperature distribution detector 52 may be performed using an infrared thermometer or the like. The temperature distribution of the metal strip 40 may also be controlled by the controller 38 based on information relating to the placement and temperature distribution of the plural magnetic cores 20 that has been found in advance using simulations, without using the temperature distribution detector 52 to detect the temperature distribution. In such cases, the controller 38 controls the moving mechanisms 30 so as to move the plural magnetic cores 20 based on the placement information of the plural magnetic cores 20 that has been found in advance using simulations, and signals from the strip width/edge position detector 51. Note that the metal strip 40 is formed substantially in an elongated strip shape (belt shape), is conveyed inside the induction heating device 10 along its length direction (in the arrow E direction in FIG. 1), and is continuously heated by the induction heating device 10. The induction heating device 10 is capable of heating respective metal strips 40 having different strip widths to each other, and FIG. 1 illustrates an example in which a metal strip 40 having a broad strip width (the maximum strip width that can be heated by the induction heating device 10) has been disposed inside the induction heating device 10.

In the following explanation, a strip thickness direction of the metal strip 40 is taken as an up-down direction of the induction heating device 10. A front face side of the metal strip 40 (the arrow A direction side in FIG. 2) is the upper side, and a reverse face side of the metal strip 40 (the arrow B direction side in FIG. 2) is the lower side. The width direction of the induction heating device 10 corresponds to the strip width direction (width direction) of the metal strip 40. The arrow C direction side in FIG. 2 is one strip width direction side of the metal strip 40, and the arrow D direction side in FIG. 2 is the other strip width direction side of the metal strip 40. Moreover, in the induction heating device 10 (specifically, the relevant portions of the induction heating device 10 illustrated in the drawings), an upper section (a section at the upper side of the metal strip 40) and a lower section (a section at the lower side of the metal strip 40) of the induction heating device 10 are configured with point symmetry about a center point (not illustrated in the drawings) of the metal strip 40 as viewed in cross-section from the length direction of the metal strip 40. Accordingly, in the following explanation, explanation is given regarding the upper section of the induction heating device 10, and explanation regarding the lower section of the induction heating device 10 will be omitted.

Figure 3:
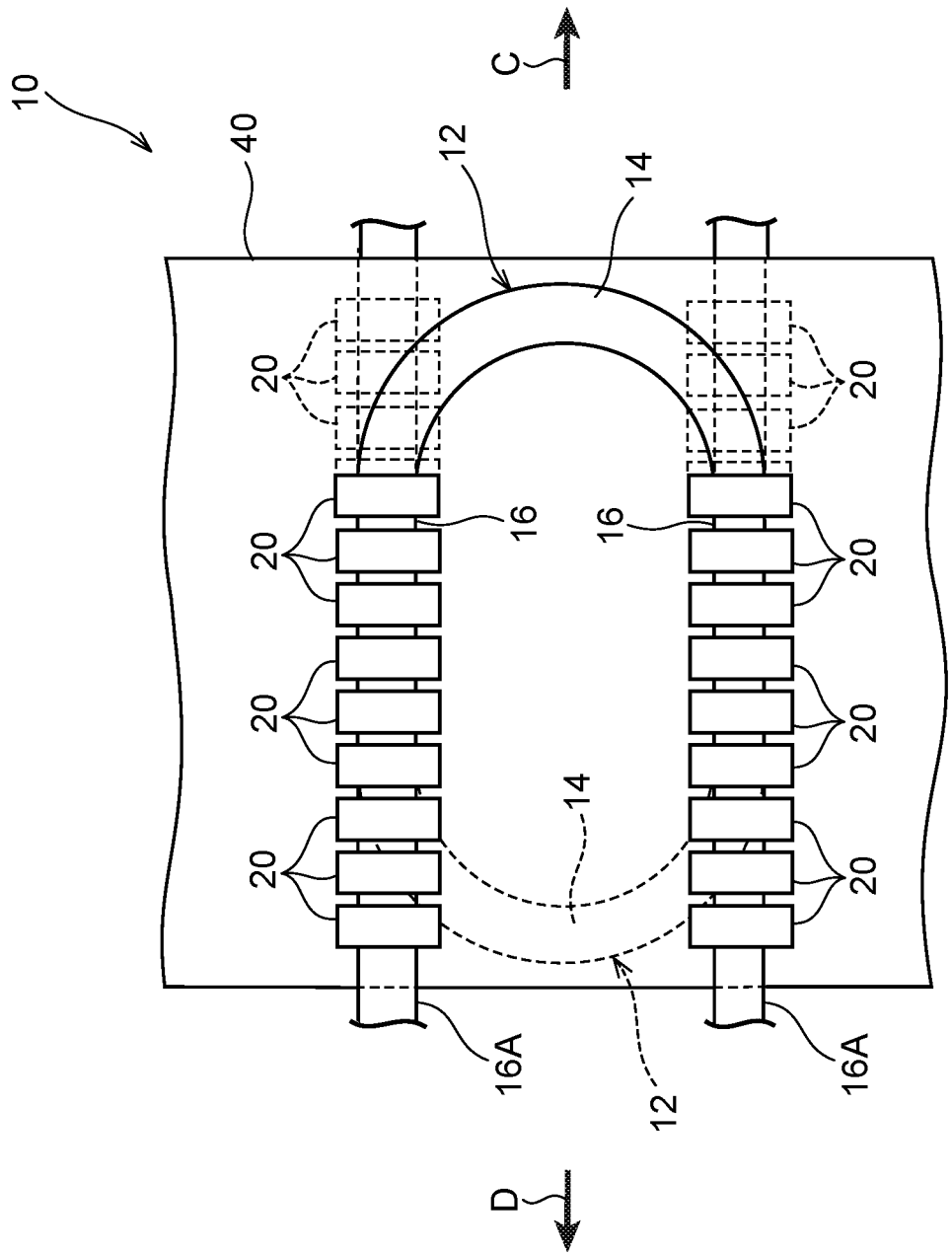
FIG. 3 is a schematic plan view illustrating relevant portions of the metal strip induction heating device illustrated in FIG. 2.

The induction coils 12 are configured from a conductor such as copper, and are provided at a separation toward the upper side of the metal strip 40. Note that each induction coil 12 may be configured from a single conductor, or may be configured from plural conductors. Moreover, as illustrated in FIG. 3, as viewed in plan view from the upper side, each induction coil 12 is formed substantially in a U-shape opening toward the other strip width direction side of the metal strip 40. Specifically, each induction coil 12 is configured including a curved portion 14 configuring one length direction end portion of the induction coil 12, and a pair of straight portions 16 that are respectively coupled to both length direction ends of the curved portion 14 at one end, and extend out from the two length direction ends of the curved portion 14 toward the other strip width direction side of the metal strip 40. In plan view, the curved portion 14 is curved substantially in a semicircular arc shape opening toward the other strip width direction side of the metal strip 40, and is disposed facing one strip width direction edge portion of the metal strip 40 in the up-down direction. Note that in FIG. 3, the moving mechanism 30, described later, is not illustrated in the interest of simplicity.

The pair of straight portions 16 are disposed side-by-side in the length direction of the metal strip 40. Moreover, as illustrated in FIG. 2, a portion on the other end side of each straight portion 16 is configured by a flexible conductor 16A that has flexible properties. Each flexible conductor 16A is coupled to one length direction side portion of the straight portion 16 through a coupling portion 16B. Each flexible conductor 16A is bent toward the upper side with respect to the metal strip 40 at a position at the width direction outside of the metal strip 40. Moreover, the other end of each flexible conductor 16A (the other end of each induction coil 12) is connected to an alternating current power source through a controller (not illustrated in the drawings). Accordingly, by moving the other end portion of the flexible conductor 16A in the up-down direction (directions toward and away from the metal strip 40) with the controller, a portion on one end side of the induction coil 12 (the curved portion 14 and part of each straight portion 16) is configured so as to move in the strip width direction of the metal strip 40. Note that the position of the bent portion of the flexible conductor 16A is retained at a constant position when moving the one end side portion of the induction coil 12 in the strip width direction of the metal strip 40.

The plural magnetic cores 20 are disposed on the opposite side from the metal strip 40 with respect to the straight portions 16 of the induction coils 12 (namely on the upper side). Each of the magnetic cores 20 is configured from a ferromagnetic core, and is, for example, configured from ferrite, layered electromagnetic steel plates, amorphous alloys, or the like. Note that the magnetic cores 20 may have an appropriately selected design according to the heating ability given to the induction heating device 10, in order to avoid magnetic flux saturation. Moreover, if there is a concern that the magnetic cores 20 will generate heat, it is desirable to cool the magnetic cores 20 with a cooling system using water-cooled copper plates or the like.

Each magnetic core 20 is formed in a rectangular block shape. A width dimension (length in the strip width direction of the metal strip 40), height dimension (length in the up-down direction), and depth dimension (length in the length direction of the metal strip 40) of the magnetic cores 20 are set as appropriate based on the shape and length of the induction coils 12. Note that the shape of the magnetic cores 20 is not limited to a rectangular block shape. The magnetic cores 20 are coupled to the moving mechanism 30, described later, and are disposed side-by-side at a specific spacing d in the strip width direction of the metal strip 40 at the upper side of the straight portions 16 of the induction coils 12. Namely, as illustrated in FIG. 3, in plan view, the magnetic cores 20 are disposed in two rows in the length direction of the metal strip 40, each row configured by plural of the magnetic cores 20 disposed side-by-side along the strip width direction of the metal strip 40.

Figure 4:
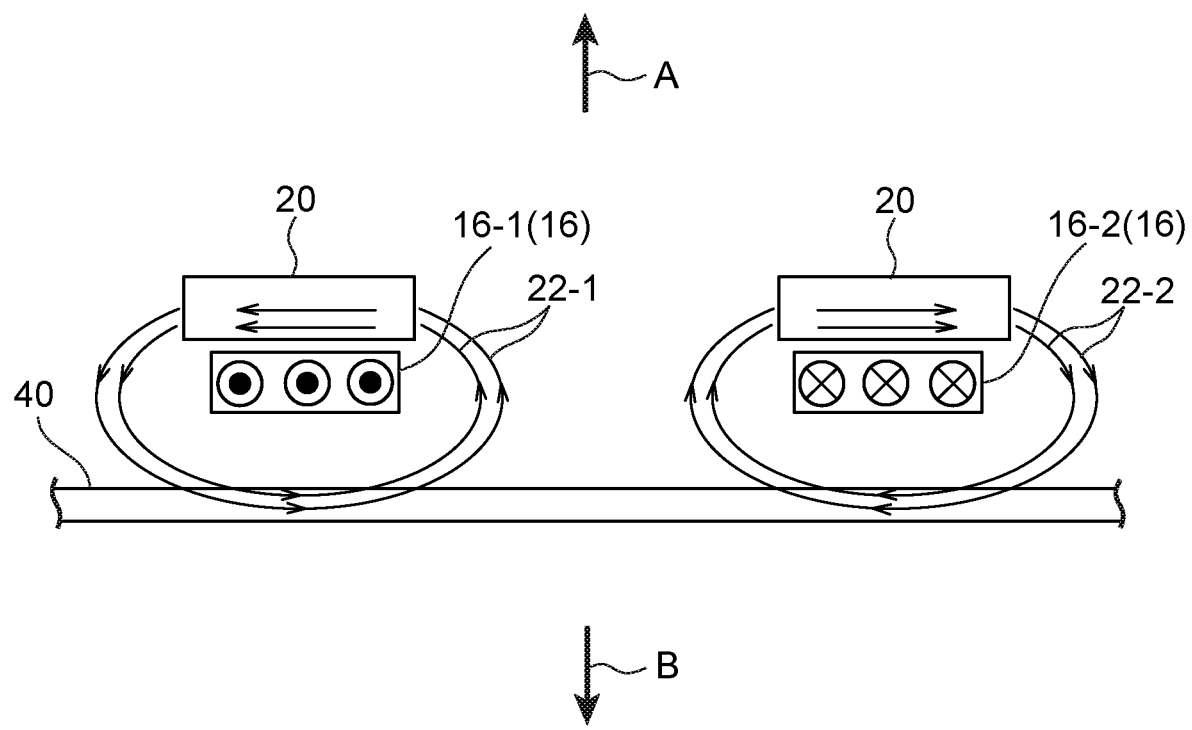
FIG. 4 is an explanatory diagram viewed from one strip width direction side of a metal strip to explain magnetic flux arising due to an induction coil illustrated in FIG. 3.

Explanation follows regarding magnetic flux generated by the induction coils 12. As illustrated in FIG. 4, current flows toward the one strip width direction side of the metal strip 40 (perpendicular to the page in a direction toward the reader (the front side of the page)) in one straight portion 16-1 of each induction coil 12 disposed at the upper side of the metal strip 40, and current flows toward the other width direction side of the metal strip 40 (perpendicular to the page in a direction away from the reader (the back side of the page)) in the other straight portion 16-2 of the induction coil 12. Accordingly, magnetic flux 22-1 arises in the straight portion 16-1, and magnetic flux 22-2 arises in the straight portion 16-2.

The magnetic flux 22-1 generated by the straight portion 16-1 passes preferentially through the inside of the magnetic cores 20, which have high magnetic permeability, and penetrates the length direction (direction of progress) cross-section of the metal strip 40 directly below the straight portion 16-1. The magnetic flux 22-2 generated by the straight portion 16-2 passes preferentially through the inside of the magnetic cores 20, which have high magnetic permeability, and penetrates the length direction (direction of progress) cross-section of the metal strip 40 directly below the straight portion 16-2. When this occurs, unlike in LF induction heating, induction current only flows in one direction in a front strip face of the metal strip 40, and so the induction current flows inside the metal strip 40 even when the permeation depth of the induction current is greater than the strip thickness of the metal strip 40. Moreover, as described above, the magnetic flux generated by the induction coils 12 is gathered (concentrated) by the magnetic cores 20, and flux paths guiding the magnetic flux toward the metal strip 40 are formed by the magnetic cores 20. Accordingly, the up-down direction position of the magnetic cores 20 is set as a position enabling the magnetic flux to be gathered (concentrated) effectively, and this up-down direction position of the magnetic cores 20 corresponds to a "specific position" of the present invention. Namely, at the specific position, the magnetic cores 20 are disposed at a separation by a specific distance to the upper side of the metal strip 40. This specific distance can be modified as appropriate according to the shape of the magnetic cores 20 or the like.

Figure 5:
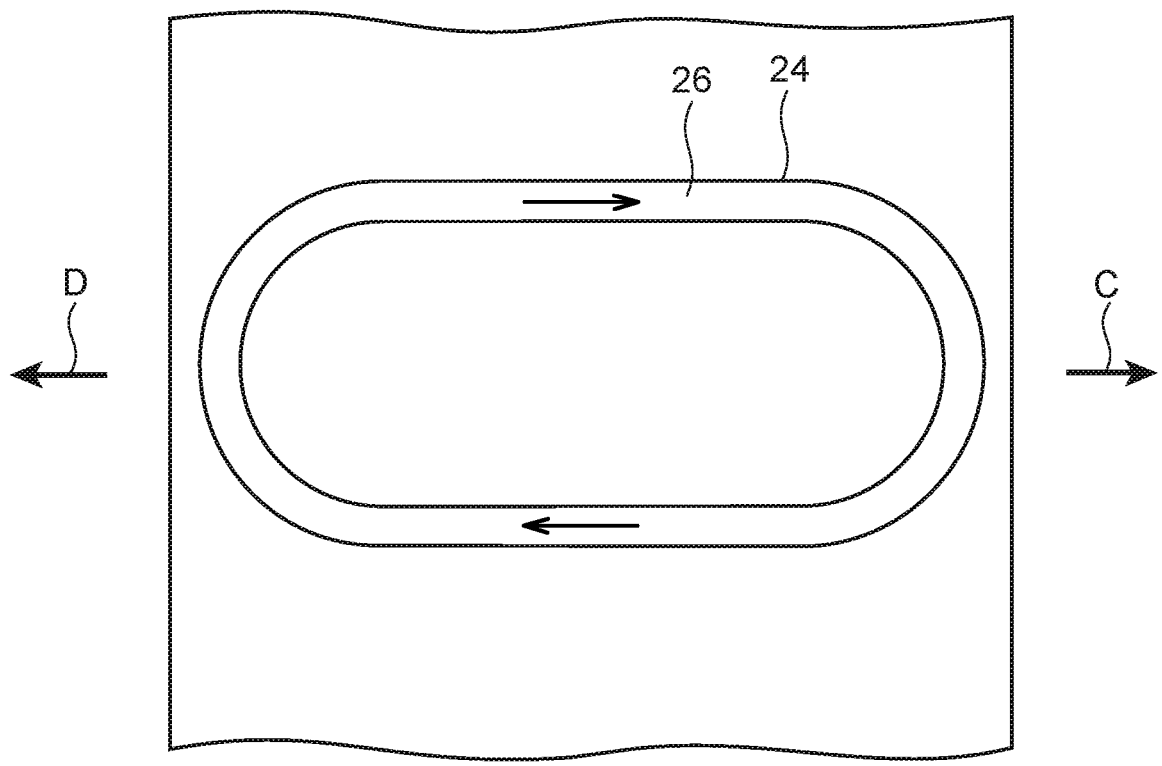
FIG. 5 is an explanatory diagram to explain induction current arising in a metal strip due to the magnetic flux illustrated in FIG. 4.

Note that similarly to above, in the induction coils 12 disposed at the lower side of the metal strip 40, magnetic flux generated by the straight portions 16 passes preferentially through the inside of the magnetic cores 20 disposed at the lower side of the metal strip 40, and penetrates the length direction (direction of progress) cross-section of the metal strip 40 directly above the straight portions 16. When this occurs, similarly to as described above, induction current only flows in one direction in a back strip face of the metal strip 40, and so the induction current flows inside the metal strip 40, even when the permeation depth of the induction current is greater than the strip thickness of the metal strip 40. Namely, although induction currents arise independently in each of the front and back faces of the metal strip 40, since the induction currents are in the same direction, in the present exemplary embodiment configuration is made such that a single closed circuit 24 having a substantially racetrack shape (closed loop shape) in plan view is formed in the metal strip 40 as illustrated in FIG. 5. The metal strip 40 is heated by an induction current 26 flowing in a loop around the closed circuit 24.

Returning to explanation of the configuration of the induction heating device 10, as illustrated in FIG. 2, the magnetic cores 20 are coupled to the moving mechanism 30, and are configured so as to be capable of moving in the strip width direction of the metal strip 40. The moving mechanism 30 is disposed at a back face side of the magnetic cores 20 (on the opposite side from the induction coils 12 with respect to the magnetic cores 20, this being the upper side). Configuration is thereby made such that the moving mechanism 30 is not subject to induction caused by the magnetic flux generated by the induction coils 12. Moreover, the use of metal as the material of the moving mechanism 30 should be avoided as far as possible, but when unavoidable, a non-magnetic metal is employed.

Each moving mechanism 30 includes a pair of guide rails (tracks) 32 formed in substantially elongated shapes. The pair of guide rails 32 are disposed side-by-side in the length direction of the metal strip 40, corresponding to the two rows of the magnetic cores 20 (only the guide rail of one row is shown in FIG. 2). Each of the guide rails 32 includes a first rail portion 32A configuring a portion on one length direction side of the guide rail 32, and a second rail portion 32B configuring a portion on the other length direction side of the guide rail 32. The first rail portion 32A is disposed directly above the plural magnetic cores 20 lying side-by-side in the strip width direction of the metal strip 40, and extends along the strip width direction of the metal strip 40. The extension length of the first rail portion 32A is set longer than a metal strip 40 having the broadest width out of various metal strips 40 with different strip widths. Accordingly, in plan view, one length direction end portion of the first rail portion 32A projects out to the width direction outside of the metal strip 40.

The second rail portion 32B is bent toward the upper side at the other length direction end portion of the first rail portion 32A, and extends out from the first rail portion 32A in a direction away from the induction coils 12. Each guide rail 32 is provided with plural moving members 34, such as a chain. The moving members 34 are movably coupled to the guide rail 32, and are disposed successively along the length direction of the guide rail 32. A drive section 36 is coupled to the moving members 34, and the moving members 34 are configured so as to be moved along the guide rail 32 by the drive section 36. Moreover, the controller 38 that controls the drive section 36 is electrically connected to the drive section 36. When the drive section 36 is actuated under the control of the controller 38, the plural moving members 34 are moved successively along the length direction of the guide rail 32 by the drive section 36.

Moreover, the magnetic cores 20 described above are fixed to the respective moving members 34. The magnetic cores 20 are disposed successively along the length direction of the guide rail 32, at the specific spacing d. Accordingly, when the moving members 34 are moved along the length direction of the guide rail 32 by the drive section 36, the moving members 34 move relative to the guide rail 32, with the specific spacing d between the magnetic cores 20 maintained. In other words, the plural magnetic cores 20 are configured to move as a single unit along the length direction of the guide rail 32. Accordingly, configuration is made such that the disposed number of the magnetic cores 20 disposed along the first rail portion 32A (namely, the magnetic cores 20 disposed at the specific position) can be increased and decreased. In the induction heating device 10, the disposed number of the magnetic cores 20 disposed at the specific position corresponds to the strip width dimension of the metal strip 40 being conveyed through the induction heating device 10.

Note that in the present exemplary embodiment, equivalent numbers of the magnetic cores 20 are disposed at the spacing d at back face sides of the straight portions 16 of both the upper and lower induction coils 12. However, the disposed number of the magnetic cores 20 is not limited to a specific range at the upper side and the lower side of the metal strip 40. Accordingly, cases arise in which the disposed numbers of the magnetic cores 20 differ between the upper side and the lower side of the metal strip 40, and the disposed number of the magnetic body cores 20 need not necessarily be the same at the upper and lower sides when making initial settings or during running. Moreover, the spacing d between adjacent magnetic cores 20 in the length direction of the guide rail 32 need not necessarily be a uniform interval. The disposed number of the magnetic cores 20 (or the interval between the magnetic cores 20) is set so as to enable a desired heating efficiency to be secured, based on the length of the induction coils 12 along which the magnetic cores 20 are disposed, the dimensions and shape of the magnetic cores 20, and the temperature distribution of the metal strip 40 in the strip width direction.

Next, explanation follows regarding operation and advantageous effects of the first exemplary embodiment.

Figure 6A:
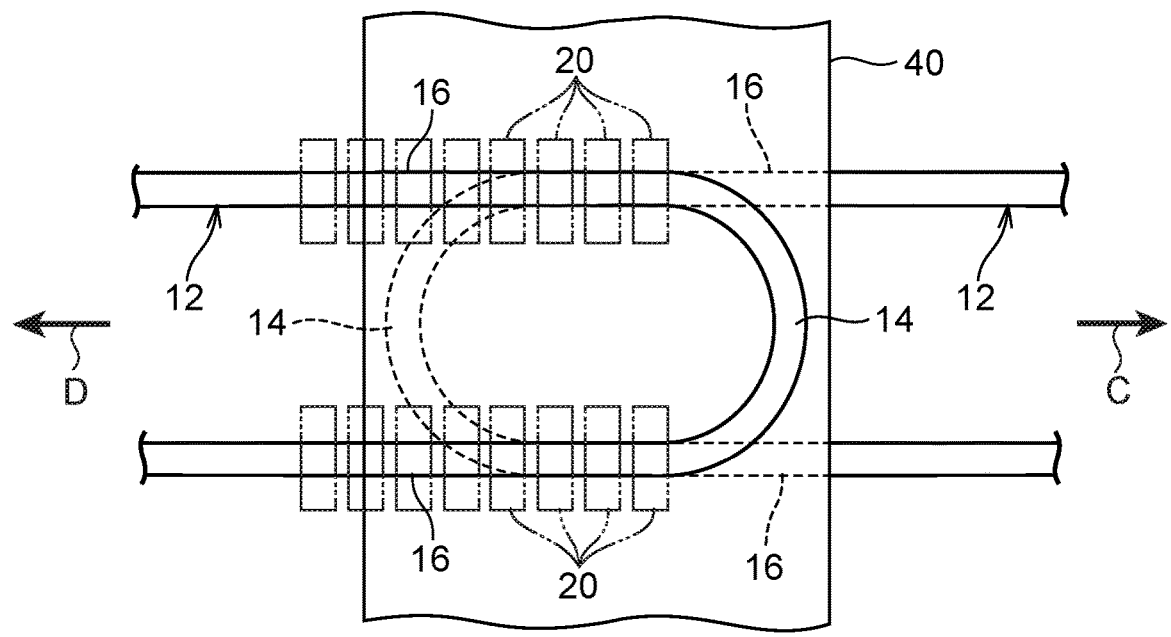
FIG. 6A is a plan view schematically illustrating placement of induction coils when heating a metal strip having a narrow strip width.
Figure 6B:
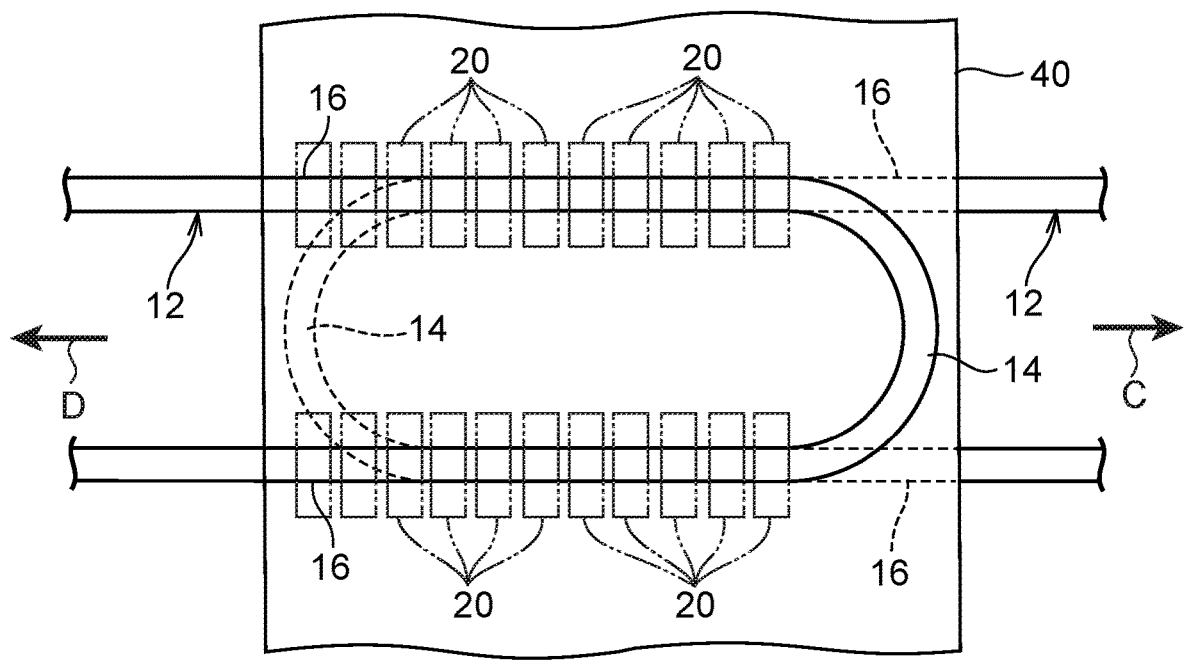
FIG. 6B is a plan view schematically illustrating placement of induction coils when heating a metal strip having a broad strip width.

In FIG. 6B, in the induction heating device 10 configured as described above, the curved portion 14 of each induction coil 12 is disposed so as to correspond to a metal strip 40 having a broad strip width, and plural of the magnetic cores 20 are disposed along the respective first rail portions 32A. Note that in FIG. 6B, for the sake of convenience, only the magnetic cores 20 disposed at the upper side of the metal strip 40 are illustrated, and the magnetic cores 20 disposed at the lower side of the metal strip 40 are omitted from illustration.

A current (primary current) is passed through the induction coils 12, such that the closed circuit 24 is formed in the metal strip 40, and the metal strip 40 is heated by the induction current 26 flowing around the closed circuit 24, as described above. Accordingly, by conveying the metal strip 40 having a broad strip width along its length direction through the induction heating device 10, the metal strip 40 is continuously heated.

When changing from a metal strip 40 having a broad strip width to a metal strip 40 having a narrow strip width, as illustrated in FIG. 6A, the curved portions 14 of the induction coils 12 are disposed at positions facing both length direction end portions of the metal strip 40 in the up-down direction. Specifically, the controller moves the other end portion of each flexible conductor 16A in a direction away from the metal strip 40 (toward the upper side), and moves the induction coils 12 (curved portions 14) toward a strip width direction center side of the metal strip 40.

When this is performed, the moving members 34 are moved along the guide rails 32 by the drive section 36 of the moving mechanism 30 according to the width dimension of the metal strip 40, and the magnetic cores 20 are moved toward the strip width direction center side of the metal strip 40 together with the moving members 34. A number of the magnetic cores 20 corresponding to the metal strip 40 having a narrow strip width are thereby disposed along each first rail portion 32A (namely, at the specific position). This thereby enables the disposed number of the magnetic cores 20 disposed facing the induction coils 12 and the metal strip 40 in the up-down direction to be reduced. Accordingly, the metal strip 40 having a narrow strip width can be heated with a reduced disposed number of the magnetic cores 20 at the metal strip 40. Note that in FIG. 6A, for the sake of convenience, only the magnetic cores 20 disposed at the upper side of the metal strip 40 are illustrated, and the magnetic cores 20 disposed at the lower side of the metal strip 40 are omitted from illustration.

Moreover, when the metal strip 40 having a narrow strip width is replaced with a metal strip 40 having a broad strip width, the state illustrated in FIG. 6A is returned to the state illustrated in FIG. 6B. Specifically, the other end portion of each flexible conductor 16A is moved in a direction approaching the metal strip 40 (toward the lower side) by the controller, and the induction coils 12 (curved portions 14) are moved toward a strip width direction outer side of the metal strip 40. When this is performed, the moving members 34 are moved along the guide rails 32 by the drive section 36 of the moving mechanism 30 according to the strip width dimension of the metal strip 40, and the magnetic cores 20 are moved toward the strip width direction outer side of the metal strip 40 together with the moving members 34. Accordingly, a number of the magnetic cores 20 corresponding to the metal strip 40 having a broad strip width are disposed along each first rail portion 32A (namely, at the specific position). This thereby enables the disposed number of the magnetic cores 20 disposed facing the induction coils 12 and the metal strip 40 in the up-down direction to be increased.

As described above, according to the induction heating device 10 of the first exemplary embodiment, the moving mechanisms 30 are coupled to the magnetic cores 20, and the disposed number of the magnetic cores 20 disposed side-by-side in the strip width direction of the metal strip 40 at the specific position is increased or decreased according to the strip width dimension of the metal strip 40. Namely, a number of the magnetic cores 20 corresponding to the strip width dimension of the metal strip 40 can be disposed at the specific position using the moving mechanisms 30. This thereby enables a more uniform heating temperature to be achieved over the strip width direction of the metal strip 40. Explanation follows regarding this point, drawing comparisons to related technology.

Namely, supposing the induction heating device 10 were to be configured similarly to the induction heating device described in JP-A No. 2002-8838, the disposed number of the magnetic cores 20 disposed along each first rail portion 32A would be fixed, with metal strips 40 with different strip widths being accommodated solely by changing (adjusting) the spacing of the plural magnetic cores 20. In such cases, a number of the magnetic cores 20 corresponding to a metal strip 40 having a narrow strip width are disposed along each first rail portion 32A, and when heating a metal strip 40 having a broad strip width, the magnetic cores 20 are moved so as to widen (enlarge) the spacing of the magnetic cores 20. Namely, the plural magnetic cores 20 are disposed intermittently along the strip width direction of the metal strip 40 across comparatively large gaps. Since no magnetic cores 20 are disposed in these gaps, the metal strip 40 is penetrated by a lower magnetic flux density at portions of the metal strip 40 corresponding to these gaps, thereby reducing the heating temperature. As a result, portions with a high heating temperature and portions with a low heating temperature alternate side-by-side along the strip width direction of the metal strip 40, giving a non-uniform (greater variation in the) heating temperature in the strip width direction of the metal strip 40.

By contrast, in the induction heating device 10 of the present exemplary embodiment, the moving mechanisms 30 move the magnetic cores 20 along the guide rails 32 according to the strip width dimension of the metal strip 40, thereby increasing or decreasing the disposed number of the magnetic cores 20 at the specific position disposed side-by-side in the strip width direction of the metal strip 40. Accordingly, even if the strip width of the metal strip 40 were to change, a number of the magnetic cores 20 corresponding to the strip width of the metal strip 40 can be disposed at the specific position. Namely, when heating a metal strip 40 having a broad strip width, the disposed number of the magnetic cores 20 disposed at the specific position can be increased in comparison to when heating a metal strip 40 having a narrow strip width. This thereby enables gaps between the magnetic cores 20 in the strip width direction of the metal strip 40 to be suppressed from becoming large, even when heating a metal strip 40 having a broad strip width. In other words, the magnetic cores 20 can be disposed at an appropriate spacing even when there is a large change in the strip width dimension of the metal strip 40. This thereby enables a more uniform heating temperature to be achieved over the strip width direction of the metal strip 40 (enables variation in the heating temperature to be suppressed).

Note that the induction heating device 10 includes the strip width/edge position detector 51 and the temperature distribution detector 52. Accordingly, for example, when heating the metal strip 40, the drive section 36 may be controlled by the controller 38 to perform fine adjustments to the position of the magnetic cores 20 in the strip width direction of the metal strip 40 so as to accommodate meanders in the metal strip 40, based on signals output from the strip width/edge position detector 51. Moreover, for example, when heating the metal strip 40, the drive section 36 may be controlled by the controller 38 to perform fine adjustments to the position of the magnetic cores 20 in the strip width direction of the metal strip 40, based on signals output from the temperature distribution detector 52 according to the temperature distribution of the metal strip 40. This thereby enables greater heating temperature uniformity to be effectively achieved over the strip width direction of the metal strip 40.

Second Exemplary Embodiment

Figure 7:
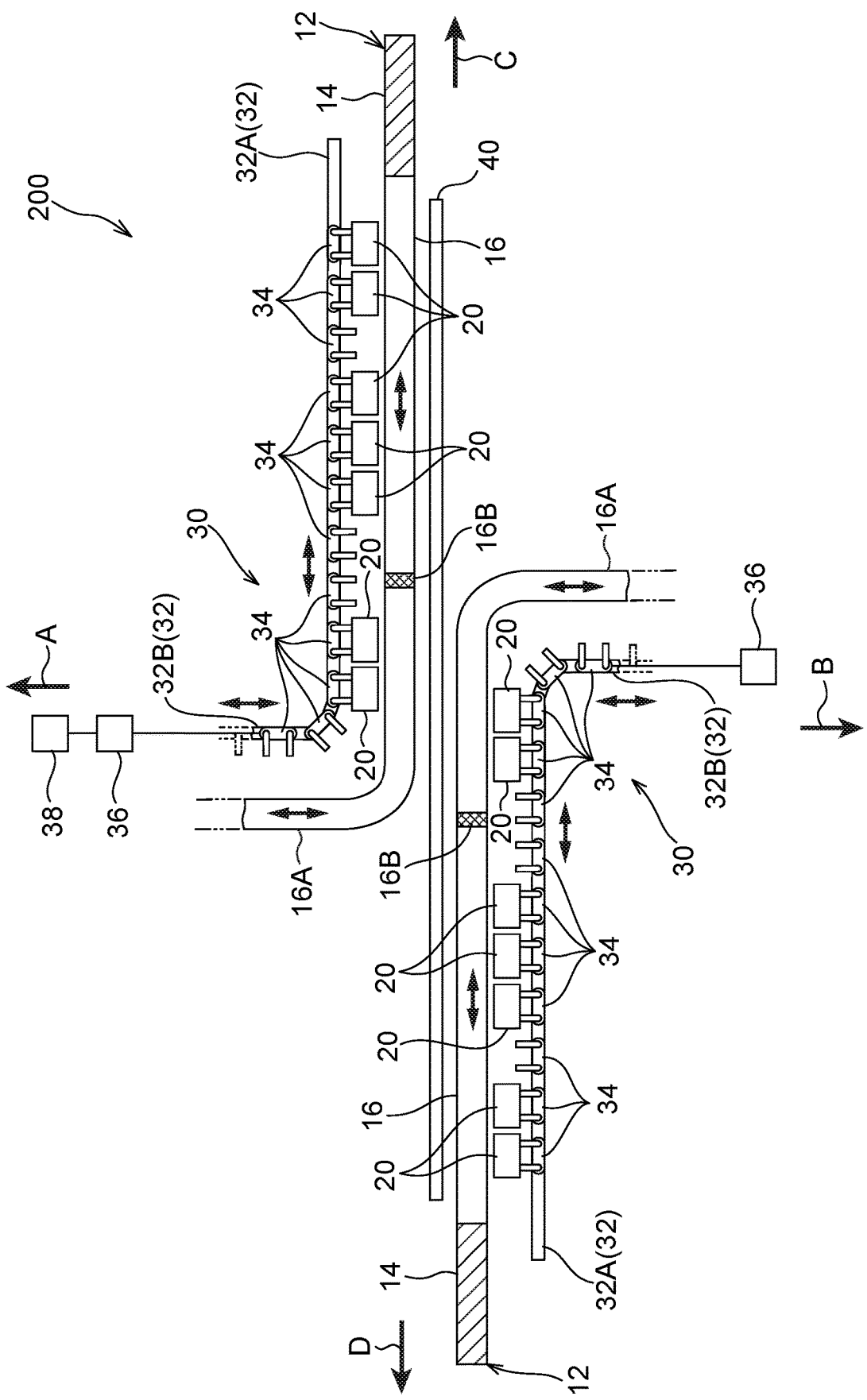
FIG. 7 is a schematic front view as viewed from the length direction of a metal strip, illustrating relevant portions of a metal strip induction heating device according to a second exemplary embodiment, with a metal strip having a broad strip width disposed therein.
Figure 8:
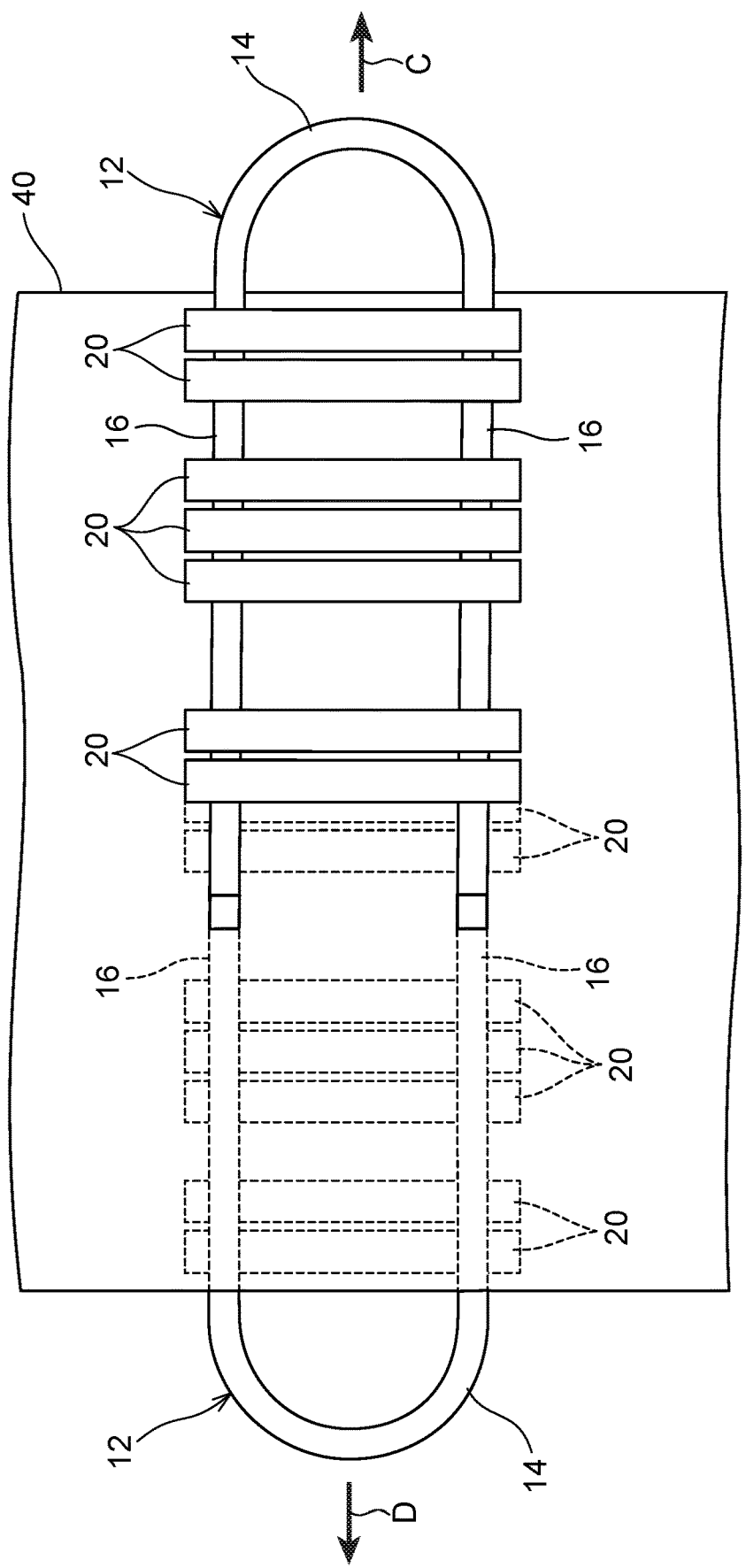
FIG. 8 is a schematic plan view illustrating relevant portions of the metal strip induction heating device illustrated in FIG. 7.
Figure 9:
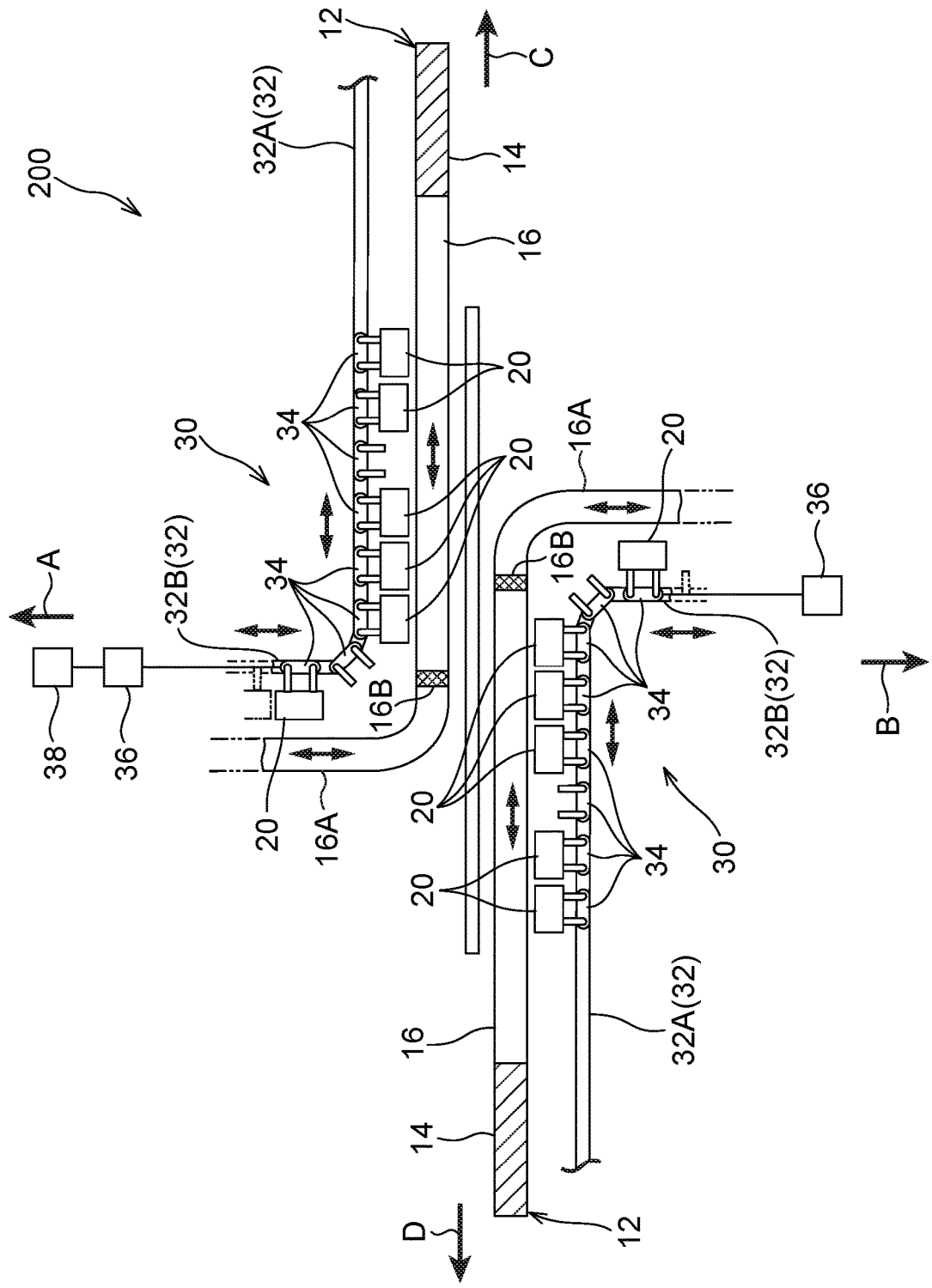
FIG. 9 is a schematic front view as viewed from the length direction of a metal strip, illustrating relevant portions of the metal strip induction heating device illustrated in claim 7, in a state after changing to a metal strip having a narrow strip width.
Figure 10:
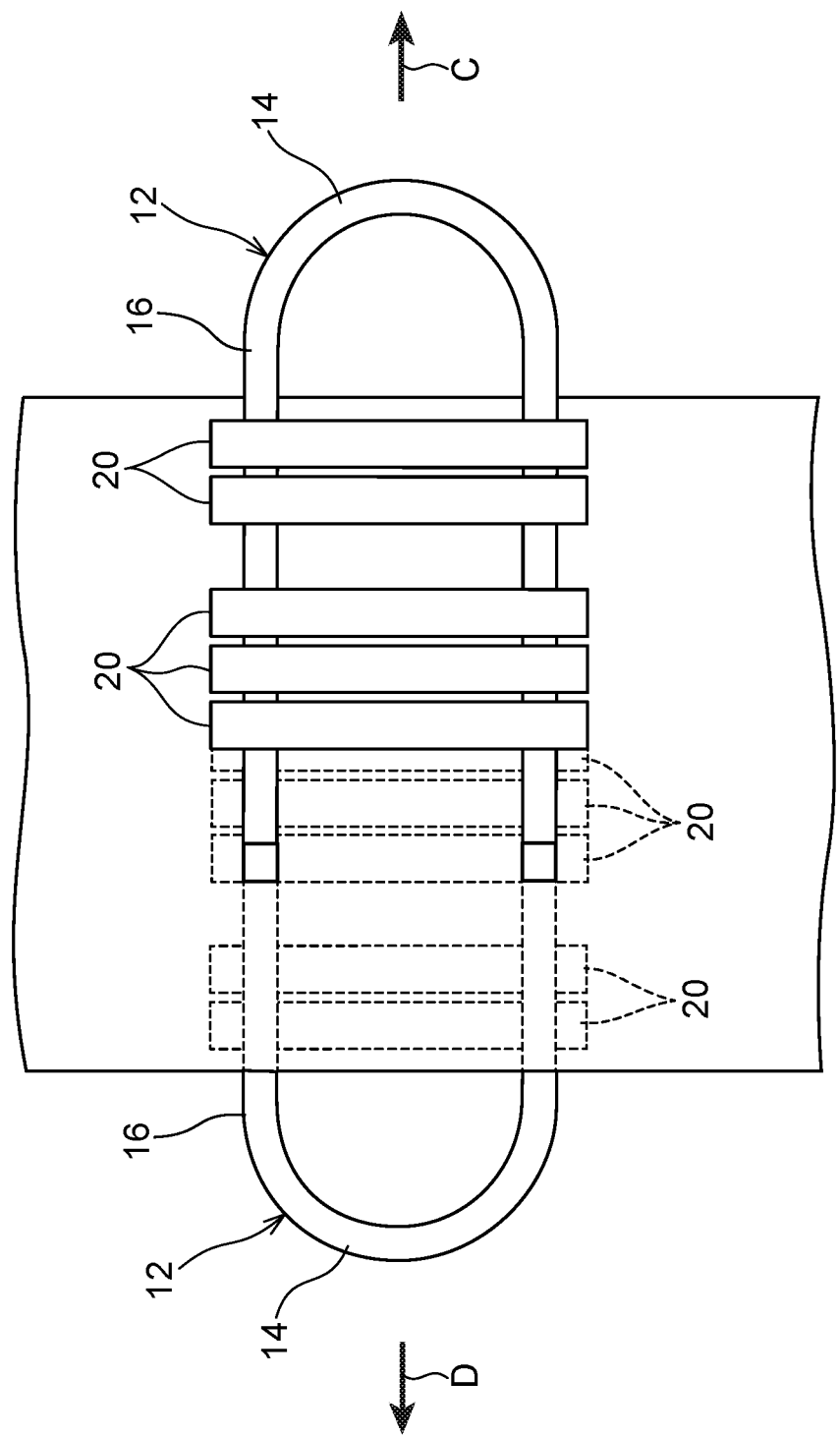
FIG. 10 is a schematic plan view illustrating relevant portions of the metal strip induction heating device illustrated in FIG. 9.

Explanation follows regarding an induction heating device 200 of a second exemplary embodiment, with reference to FIG. 7 to FIG. 10. The induction heating device 200 of the second exemplary embodiment is configured similarly to the induction heating device 10 of the first exemplary embodiment, with the exception of the following points. Note that FIG. 7 and FIG. 8 illustrate an example in which a metal strip 40 having a broad strip width is disposed in the induction heating device 200, and FIG. 9 and FIG. 10 illustrate an example in which a metal strip 40 having a narrow strip width is disposed in the induction heating device 200.

The induction coils 12 of the second exemplary embodiment are configured similarly to the induction coils 12 of the first exemplary embodiment. However, the positions of the curved portion 14 and the flexible conductor 16A differ from in the first exemplary embodiment. Namely, in the second exemplary embodiment, the curved portions 14 are disposed at the width direction outside of the metal strip 40 in plan view (see FIG. 9 and FIG. 10). In other words, only the straight portions 16 of the induction coils 12 are disposed facing the metal strip 40 in the up-down direction.

Moreover, the flexible conductors 16A of the induction coil 12 disposed at the upper side (lower side) of the metal strip 40 are bent toward the upper side (lower side) at a position toward the other width direction side (one width direction side) of a width direction center line of the metal strip 40. Namely, in plan view, the straight portions 16 of the induction coils 12 disposed at the upper side and the lower side of the metal strip 40 are disposed partially lining up with (overlapping) each other.

The moving mechanisms 30 are disposed corresponding to the induction coils 12. Namely, the first rail portion 32A of the guide rail 32 of the moving mechanism 30 extends along the strip width direction of the metal strip 40, parallel to the straight portion 16 at a position at the upper side of the straight portion 16 of the induction coil 12. Moreover, the second rail portion 32B of the guide rail 32 extends along the up-down direction parallel to the flexible conductor 16A at a position on the metal strip 40 strip width direction one side with respect to the flexible conductor 16A.

In the second exemplary embodiment, as illustrated in FIG. 8 and FIG. 10, the magnetic cores 20 extend along the length direction of the metal strip 40 so as to straddle the pair of straight portions 16 of each induction coil 12 as viewed in plan view from the upper side. Namely, in the second exemplary embodiment, plural of the magnetic cores 20 lying side-by-side in the strip width direction of the metal strip 40 configure a single row. The magnetic cores 20 are not disposed successively in the length direction of the guide rails 32. Namely, the spacings between adjacent magnetic cores 20 are not uniform. Accordingly, portions are present where there are large gaps between adjacent magnetic cores 20. However, these gaps are set within a range in which the heating temperature of the metal strip 40 will not decrease.

As illustrated in FIG. 7 and FIG. 8, when heating a metal strip 40 having a broad strip width, the curved portion 14 of each induction coil 12 is disposed at a position at the strip width direction outside of the metal strip 40. Specifically, the other end portion of each flexible conductor 16A is moved in a direction approaching the metal strip 40 (toward the lower side) by the controller, thereby moving the induction coil 12 (curved portion toward the strip width direction outside of the metal strip 40.

When this is performed, the moving members 34 are moved along the guide rails 32 by the drive sections 36 of the moving mechanisms 30, and the magnetic cores 20 are moved in the strip width direction of the metal strip 40 together with the moving members 34, according to the strip width dimension of the metal strip 40. Plural of the magnetic cores 20 are thereby disposed along the first rail portions 32A according to the metal strip 40 having a broad strip width. The disposed number of the magnetic cores 20 disposed facing the induction coils 12 and the metal strip 40 in the up-down direction can accordingly be increased.

By contrast, as illustrated in FIG. 9 and FIG. 10, when the metal strip 40 having a broad strip width is changed to a metal strip 40 having a narrow strip width, the other end portion of each flexible conductor 16A is moved in a direction away from the metal strip 40 (toward the upper side) by the controller, and the curved portion 14 of each induction coil 12 is moved toward the strip width direction center side of the metal strip 40.

When this is performed, the moving members 34 are moved along the first guide rails 32A by the drive sections 36 of the moving mechanisms 30, and the magnetic cores 20 are moved toward the strip width direction center side of the metal strip 40 together with the moving members 34, according to the strip width dimension of the metal strip 40. Accordingly, the magnetic cores 20 are disposed along the guide rail 32 corresponding to the metal strip 40 having a narrow strip width, thereby decreasing the disposed number of the magnetic cores 20 disposed facing the induction coil 12 and the metal strip 40 in the up-down direction.

Due to the above, the second exemplary embodiment also enables a number of the magnetic cores 20 corresponding to the strip width of the metal strip 40 to be disposed at the specific position. Accordingly, the second exemplary embodiment also enables a more uniform heating temperature to be achieved over the strip width direction of the metal strip 40.

Moreover, in the second exemplary embodiment, the induction heating device 200 also includes the strip width/edge position detector 51 and the temperature distribution detector 52. Accordingly, for example, similarly to in the first exemplary embodiment, fine adjustments to the position of the magnetic cores 20 in the strip width direction of the metal strip 40 may be performed to accommodate meanders in the metal strip 40. Moreover, for example, fine adjustments to the position of the magnetic cores 20 in the strip width direction of the metal strip 40 may be performed according to the temperature distribution of the metal strip 40.

Third Exemplary Embodiment

Figure 11:
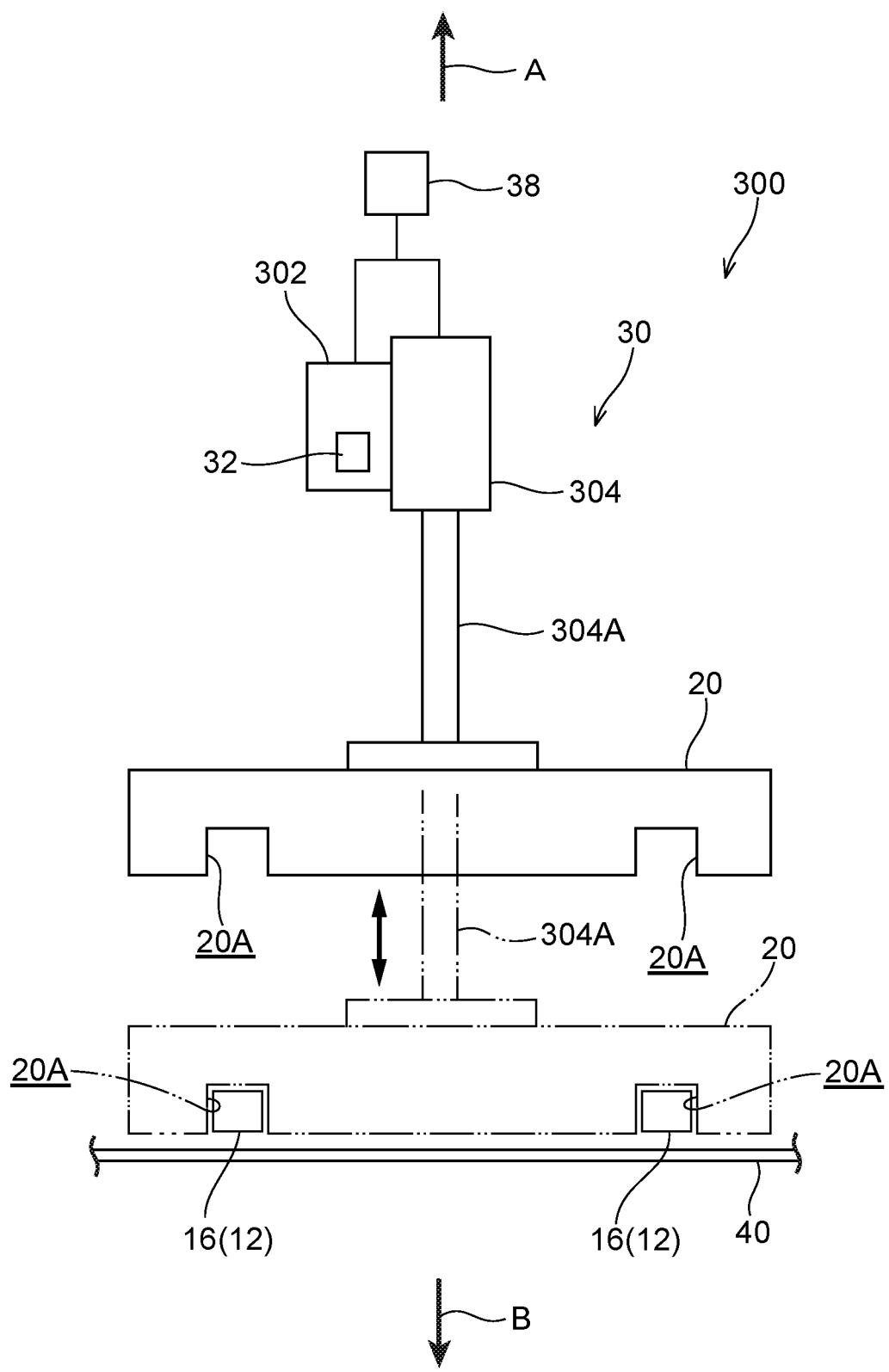
FIG. 11 is a side view as viewed from one strip width direction side of a metal strip, illustrating relevant portions of a metal strip induction heating device of a third exemplary embodiment.
Figure 12:
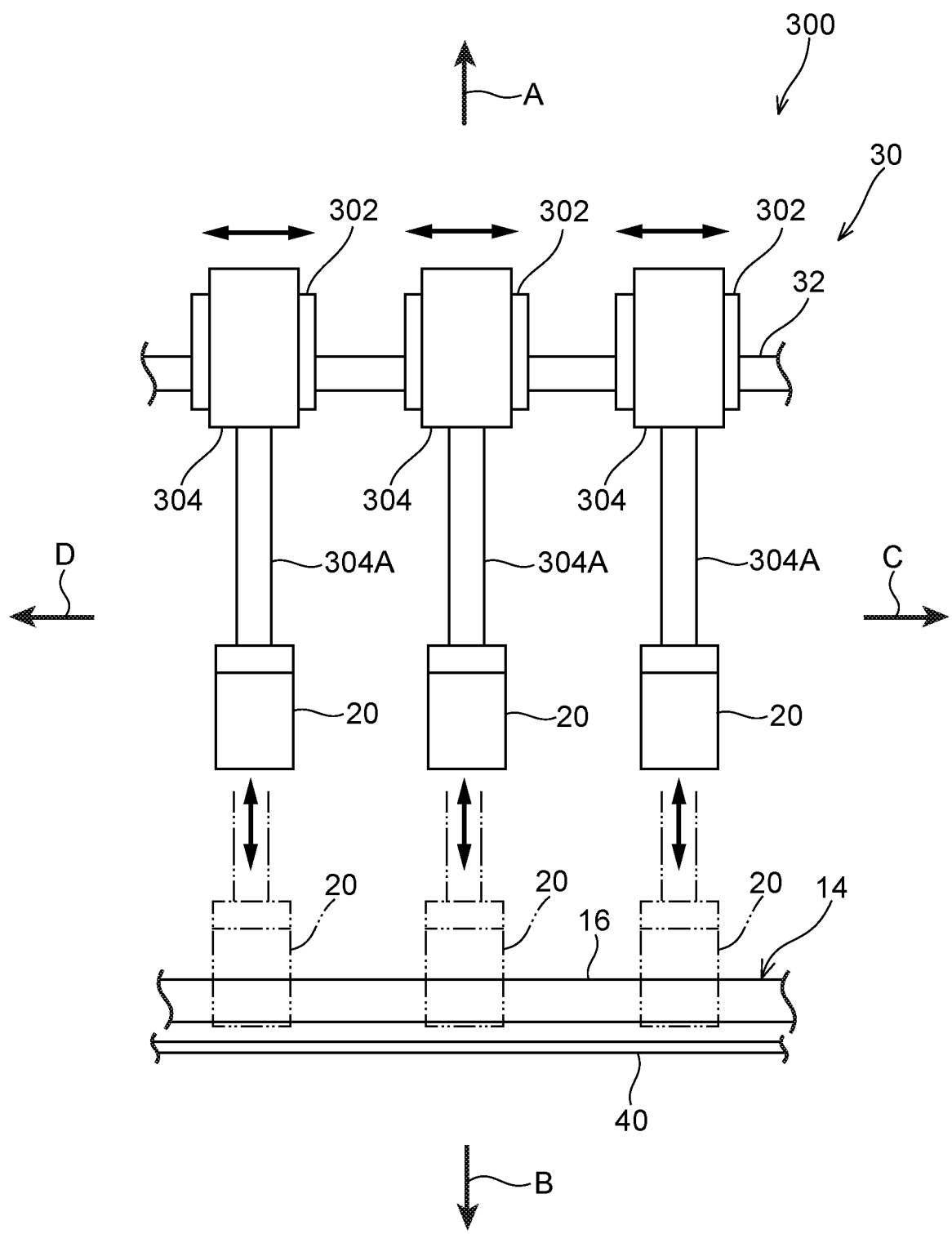
FIG. 12 is a schematic front view illustrating relevant portions of the metal strip induction heating device illustrated in FIG. 11 as viewed from the length direction of the metal strip.

Explanation follows regarding an induction heating device 300 of a third exemplary embodiment, with reference to FIG. 11 and FIG. 12. The induction heating device 300 of the third exemplary embodiment is configured similarly to the induction heating device 10 of the first exemplary embodiment, with the exception of the following points. Note that FIG. 11 is a side view as viewed from one strip width direction side of the metal strip 40, and illustrates only relevant portions in an upper section of the induction heating device 300 (a section to the upper side of the metal strip 40). FIG. 12 is a schematic front view as viewed from the length direction of the metal strip 40, and illustrates only relevant portions in the upper section of the induction heating device 300.

In the first exemplary embodiment, configuration is made in which plural of the magnetic cores 20 are moved as a unit by the moving mechanism 30. However, in the third exemplary embodiment, each of the magnetic cores 20 is configured so as to be capable of being moved independently by the moving mechanism 30. Detailed explanation follows regarding this.

In the third exemplary embodiment, the moving members 34 and the drive section 36 are omitted from the moving mechanism 30, and the moving mechanism 30 includes plural moving devices 302 and approach/separation devices 304. The respective moving devices 302 are movably coupled to the guide rails 32, and each include a drive section, not illustrated in the drawings. The respective moving devices 302 are electrically connected to the controller 38 (see FIG. 11), and are configured so as to be moved independently of each other along the guide rail 32 under the control of the controller 38.

The approach/separation devices 304 are fixed to the respective moving devices 302. Accordingly, the approach/separation devices 304 are configured so as to move as a unit with the moving devices 302 when the moving devices 302 are moved with respect to the guide rail 32. Each approach/separation device 304 includes a cylinder 304A, operated hydraulically, for example, and the cylinder 304A projects out from the approach/separation device 304 toward the lower side. The approach/separation devices 304 are also electrically connected to the controller 38 (see FIG. 11), and the cylinders 304A extend and retract in the up-down direction under the control of the controller 38.

A magnetic core 20 is fixed to a lower end of each cylinder 304A. Similarly to in the second exemplary embodiment, the magnetic cores 20 extend along the length direction of the metal strip 40 so as to straddle the pair of straight portions 16 of the induction coil 12. Namely, in the third exemplary embodiment, plural of the magnetic cores 20 lying side-by-side in the strip width direction of the metal strip 40 configure a single row. A lower face of each magnetic core 20 is formed with recesses 20A opening toward the lower side at positions corresponding to the pair of straight portions 16 of the induction coil 12, and the recesses 20A penetrate the magnetic core 20 along the strip width direction of the metal strip 40.

The cylinder 304A of each approach/separation device 304 is configured so as to move the magnetic core 20 in the up-down direction (directions toward and away from the metal strip 40 in the strip thickness direction of the metal strip 40) by extending and retracting in the up-down direction. Specifically, using the cylinder 304A, the magnetic core 20 is configured to move between the specific position (the position of the magnetic cores 20 illustrated by double-dotted dashed lines in FIG. 11 and FIG. 12), and a standby position positioned further to the upper side than the specific position (the position of the magnetic cores 20 illustrated by solid lines in FIG. 11 and FIG. 12). At the specific position, the straight portions 16 of the induction coil 12 are disposed inside the recesses 20A. The standby position is set as a position where the magnetic flux generated by the induction coil 12 cannot be concentrated effectively by the magnetic core 20. Namely, in a state in which the magnetic core 20 is disposed at the standby position, the magnetic core 20 does not contribute to concentrating the magnetic flux of the induction coil 12. Note that the magnetic cores 20 are disposed in the standby position at times other than when heating the metal strip 40.

In the induction heating device 300 of the third exemplary embodiment, the controller 38 of the moving mechanism 30 moves the respective moving devices 302 along the guide rails 32 independently of each other according to the strip width dimension of the metal strip 40. A number of the magnetic cores 20 corresponding to the strip width dimension of the metal strip 40 are thereby disposed along the first rail portions 32A. In this state, the magnetic cores 20 are disposed at the standby position, and so the approach/separation devices 304 are actuated by the controller 38 of the moving mechanism 30 in order to dispose the magnetic cores 20 at the specific position. Namely, the cylinders 304A are extended (moved toward) the side of the metal strip 40, disposing the magnetic cores 20 at the specific position. A number of the magnetic cores 20 corresponding to the strip width dimension of the metal strip 40 are thereby disposed at the specific position. Due to the above, the third exemplary embodiment also enables the disposed number of the magnetic cores 20 disposed side-by-side in the strip width direction of the metal strip 40 at the specific position to be increased and decreased according to the strip width dimension of the metal strip 40. This thereby enables a more uniform heating temperature to be achieved over the strip width direction of the metal strip 40.

Moreover, in the third exemplary embodiment, the plural moving devices 302 are configured so as to be capable of moving independently of each other along the guide rails 32, thereby enabling the spacing of adjacent magnetic cores 20 to be changed (adjusted) by the moving devices 302. This thereby enables the placement density of the magnetic cores 20 to be changed according to the heating temperature distribution over the strip width direction of the metal strip 40. For example, it has been found that there is a tendency for a momentary decrease in the heating temperature of the metal strip 40 at portions just inside of both strip width direction edges of the metal strip 40. Accordingly, the spacing of magnetic cores 20 corresponding to the portions just inside of both strip width direction edges of the metal strip 40 may be set narrower than the spacing of magnetic cores 20 corresponding to a strip width direction central portion of the metal strip 40. This thereby enables the density of the magnetic flux penetrating the metal strip 40 to be adjusted in the strip width direction of the metal strip 40. As a result, a more uniform heating temperature can be effectively achieved over the strip width direction of the metal strip 40. Moreover, the moving devices 302 may be moved by the controller 38 based on signals output from the temperature distribution detector 52 so as to make fine adjustments to the positions of the magnetic cores 20 according to the heating temperature distribution over the strip width direction of the metal strip 40.

Moreover, in the third exemplary embodiment, the respective magnetic cores 20 are configured so as to be capable of being moved in the up-down direction by the approach/separation devices 304 (namely, are configured so as to be capable of moving toward and away from the metal strip 40 in the strip thickness direction of the metal strip 40). This thereby enables the density of the magnetic flux penetrating the metal strip 40 to be adjusted by adjusting the up-down direction positions of the magnetic cores 20 disposed at the specific position. Accordingly, for example, the controller 38 can finely control the heating temperature of the metal strip 40 according to the heating temperature distribution over the strip width direction of the metal strip 40 by actuating the approach/separation devices 304 based on signals output from the temperature distribution detector 52. Accordingly, such cases also enable a more uniform heating temperature to be effectively achieved over the strip width direction of the metal strip 40.

In the third exemplary embodiment, configuration is made in which, after using the moving devices 302 to move the magnetic cores 20 in the strip width direction of the metal strip 40 with the cylinders 304A of the approach/separation devices 304 in a retracted state, the cylinders 304A of the approach/separation devices 304 are extended toward the side of the metal strip 40 such that from the standby position, the magnetic cores 20 are disposed at the specific position. Namely, when the magnetic cores 20 are moved in the strip width direction of the metal strip 40, the magnetic cores 20 are disposed separated to the upper side of the induction coils 12. This thereby enables collisions between inner peripheral faces of the recesses 20A of the magnetic cores 20 and the straight portions 16 of the induction coils 12 to be avoided when moving the magnetic cores 20 in the strip width direction of the metal strip 40, even supposing the magnetic cores 20 were to vibrate so as to undergo displacement along the length direction of the metal strip 40.

Moreover, in the third exemplary embodiment, the induction heating device 300 still includes the strip width/edge position detector 51. Accordingly, similarly to in the first exemplary embodiment, for example, fine adjustments to the position of the magnetic cores 20 in the strip width direction of the metal strip 40 may be performed so as to accommodate meanders in the metal strip 40.

In the third exemplary embodiment, configuration is made in which the magnetic cores 20 are moved from the standby position to the specific position by the approach/separation devices 304 after the magnetic cores 20 have been moved up to the standby position by the moving devices 302. Alternatively, the moving devices 302 may be moved along the guide rail 32 to dispose the magnetic cores 20 at the specific position with the cylinders 304A of the approach/separation devices 304 in a pre-extended state. Such cases enable the position of the magnetic cores 20 in the up-down direction to be adjusted similarly to as described above by actuating the approach/separation devices 304 after the magnetic cores 20 have been disposed at the specific position.

In the third exemplary embodiment, the moving mechanism 30 is configured including the plural moving devices 302 and approach/separation devices 304. Alternatively, the approach/separation devices 304 may be omitted from the moving mechanism 30, and the magnetic cores 20 may be fixed with respect to the moving devices 302. In such cases, configuration is made such that the magnetic cores 20 disposed at the specific position by moving the magnetic cores 20 in the strip width direction of the metal strip 40 with the moving devices 302.

Fourth Exemplary Embodiment

Figure 13:
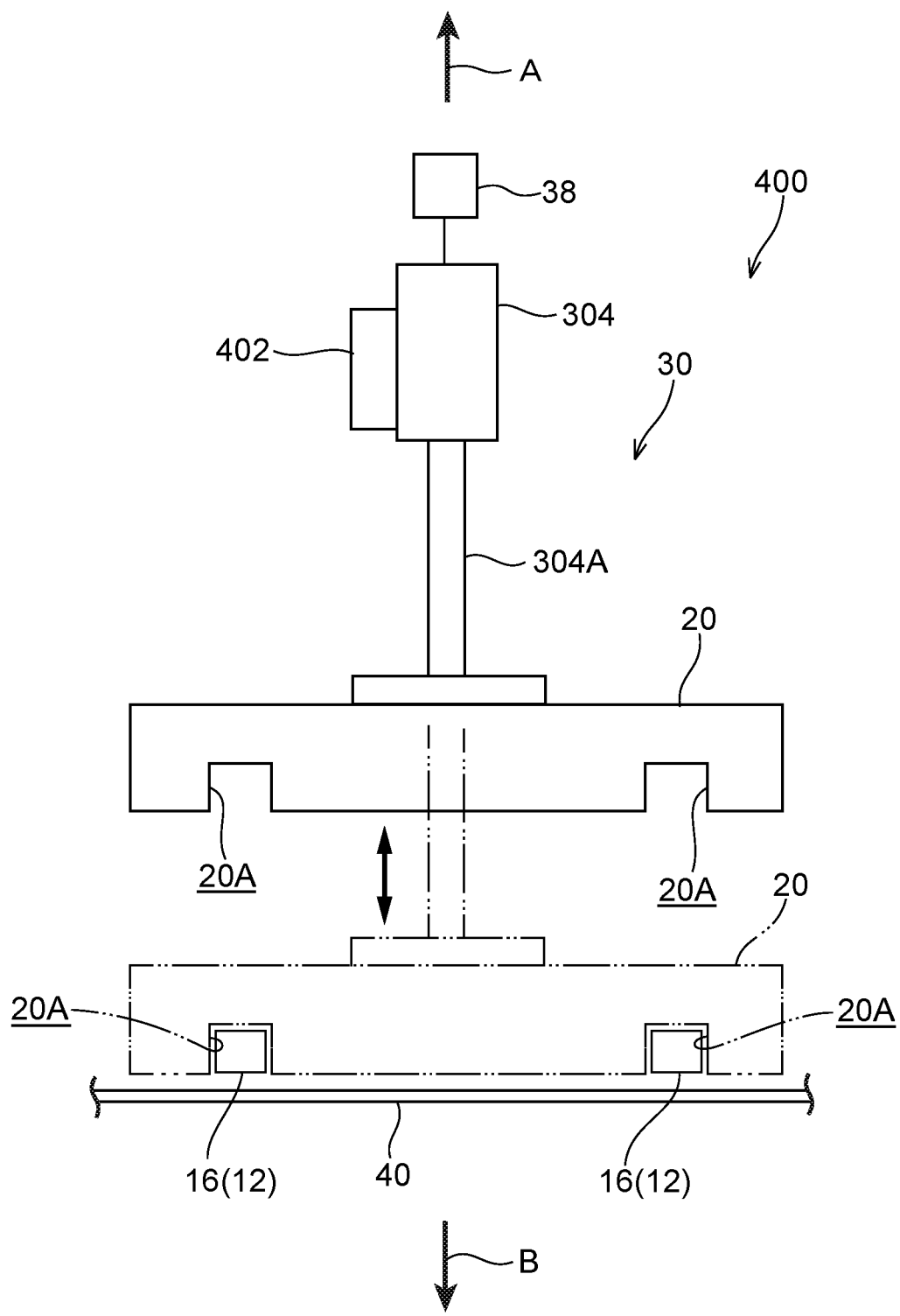
FIG. 13 is a side view as viewed from one strip width direction side of a metal strip, illustrating relevant portions of a metal strip induction heating device of a fourth exemplary embodiment.
Figure 14:
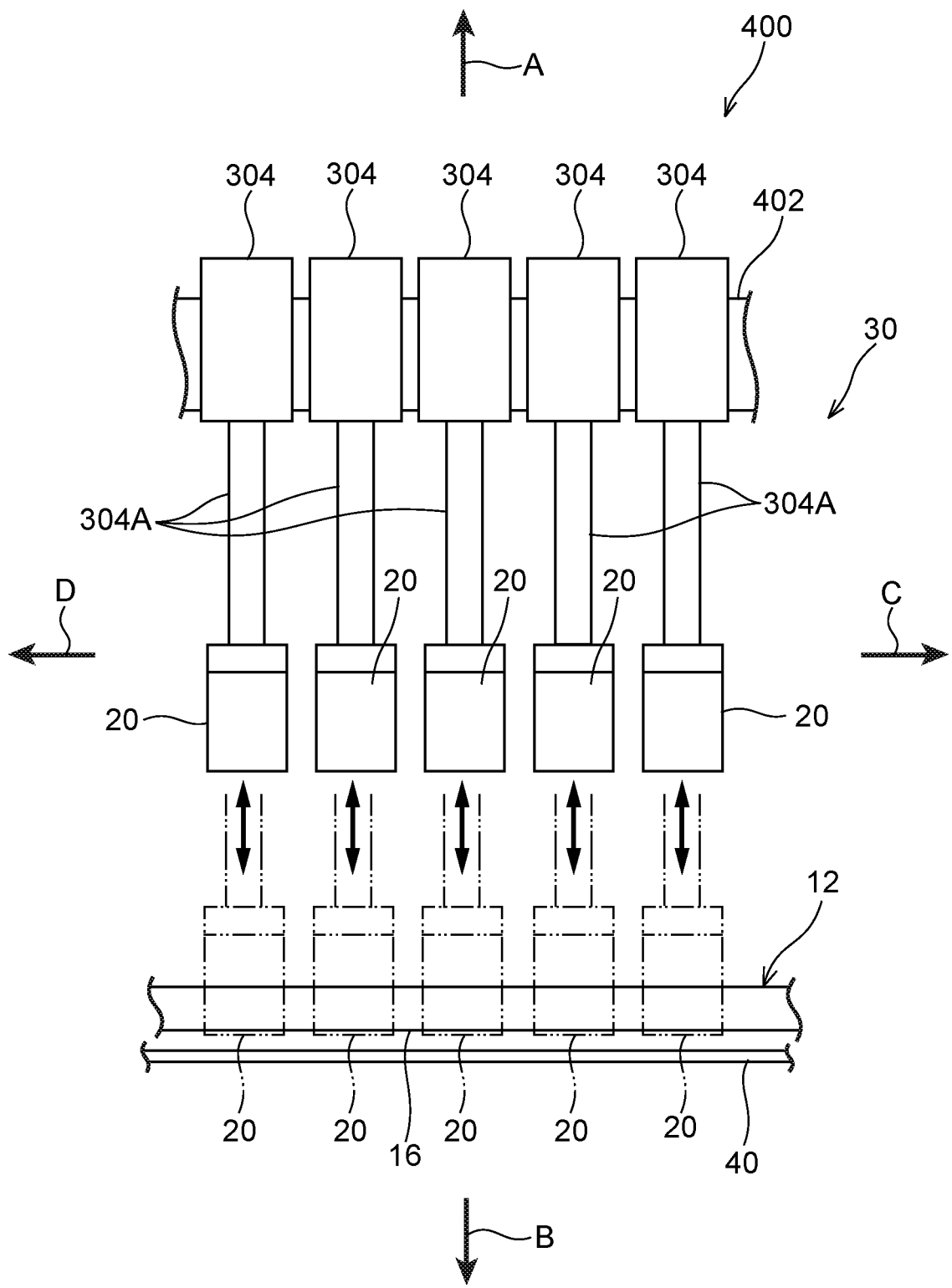
FIG. 14 is a schematic front view illustrating relevant portions of the metal strip induction heating device illustrated in FIG. 13 as viewed from the length direction of the metal strip.

Explanation follows regarding an induction heating device 400 of a fourth exemplary embodiment, with reference to FIG. 13 and FIG. 14. The induction heating device 400 of the fourth exemplary embodiment is configured similarly to the induction heating device 300 of the third exemplary embodiment, with the exception of the following points. Note that FIG. 13 is a side view from one strip width direction side of the metal strip 40, and illustrates only relevant portions in an upper section of the induction heating device 400 (a section at the upper side of the metal strip 40). FIG. 14 is a schematic front view as viewed from the length direction of the metal strip 40, and illustrates only relevant portions in the upper section of the induction heating device 400.

In the third exemplary embodiment, configuration is made such that the respective magnetic cores 20 are capable of being moved in the strip width direction of the metal strip 40 by the moving devices 302. However, in the fourth exemplary embodiment, configuration is made such that the magnetic cores 20 are not movable in the strip width direction of the metal strip 40, while making configuration such that the respective magnetic cores 20 are capable of moving in the strip thickness direction of the metal strip 40. Detailed explanation follows regarding this.

In the fourth exemplary embodiment, a support member 402 extending along the strip width direction of the metal strip 40 is provided instead of the guide rail 32. Moreover, in the fourth exemplary embodiment, the moving devices 302 are omitted from the moving mechanism 30 of the third exemplary embodiment, and the approach/separation devices 304 are fixed to the support member 402. Although not illustrated in the drawings, the induction coils 12 extend along the strip width direction of the metal strip 40. Namely, regarding the flexible conductors 16A of the induction coils 12, the curved portions 14 are omitted, and the flexible conductors 16A extend along the strip width direction of the metal strip 40.

The approach/separation devices 304 and the magnetic cores 20 are disposed side-by-side at a specific spacing in the strip width direction of the metal strip 40 in advance. Moreover, the disposed numbers thereof are set so as to accommodate a metal strip 40 having a broad strip width. Moreover, the magnetic cores 20 are configured to move between the standby position (see the magnetic cores 20 illustrated by solid lines in FIG. 13 and FIG. 14), and the specific position (see the magnetic cores 20 illustrated by double-dotted dashed lines in FIG. 13 and FIG. 14) by extending and retracting the cylinders 304A of the approach/separation devices 304.

In the induction heating device 400 of the fourth exemplary embodiment, the controller 38 of the moving mechanism 30 actuates the approach/separation devices 304 facing the metal strip 40 in the strip thickness direction, and extends the cylinders 304A such that the magnetic cores 20 are moved from the standby position to the specific position. A number of the magnetic cores 20 corresponding to the strip width dimension of the metal strip 40 are thereby disposed in the specific position. This thereby enables the disposed number of the magnetic cores 20 at the specific position disposed side-by-side in the strip width direction of the metal strip 40 to be increased or decreased according to the strip width dimension of the metal strip 40. Accordingly, the fourth exemplary embodiment also enables a more uniform heating temperature to be achieved over the strip width direction of the metal strip 40.

Moreover, in the fourth exemplary embodiment, although the magnetic cores 20 are incapable of moving in the length direction of the guide rail 32, the controller 38 is configured to control the respective approach/separation devices 304 independently of each other. This thereby enables the spacing of the magnetic cores 20 disposed at the specific position to be changed (adjusted) as appropriate by leaving some of the approach/separation devices 304 out of the approach/separation devices 304 facing the metal strip 40 in the strip thickness direction in a non-actuated state. Accordingly, similarly to in the third exemplary embodiment, the placement density of the magnetic cores 20 can be changed according to the heating temperature distribution over the strip width direction of the metal strip 40. This thereby enables a more uniform heating temperature to be effectively achieved over the strip width direction of the metal strip 40.

Moreover, in the fourth exemplary embodiment, similarly to in the third exemplary embodiment, the respective magnetic cores 20 are configured so as to be capable of being moved in the up-down direction by the approach/separation devices 304. This thereby enables the density of the magnetic flux penetrating the metal strip 40 to be adjusted by adjusting the up-down direction positions of the magnetic cores 20 disposed at the specific position. Similarly to the third exemplary embodiment, the fourth exemplary embodiment accordingly enables a more uniform heating temperature to be effectively achieved over the strip width direction of the metal strip 40.

Figure 15:
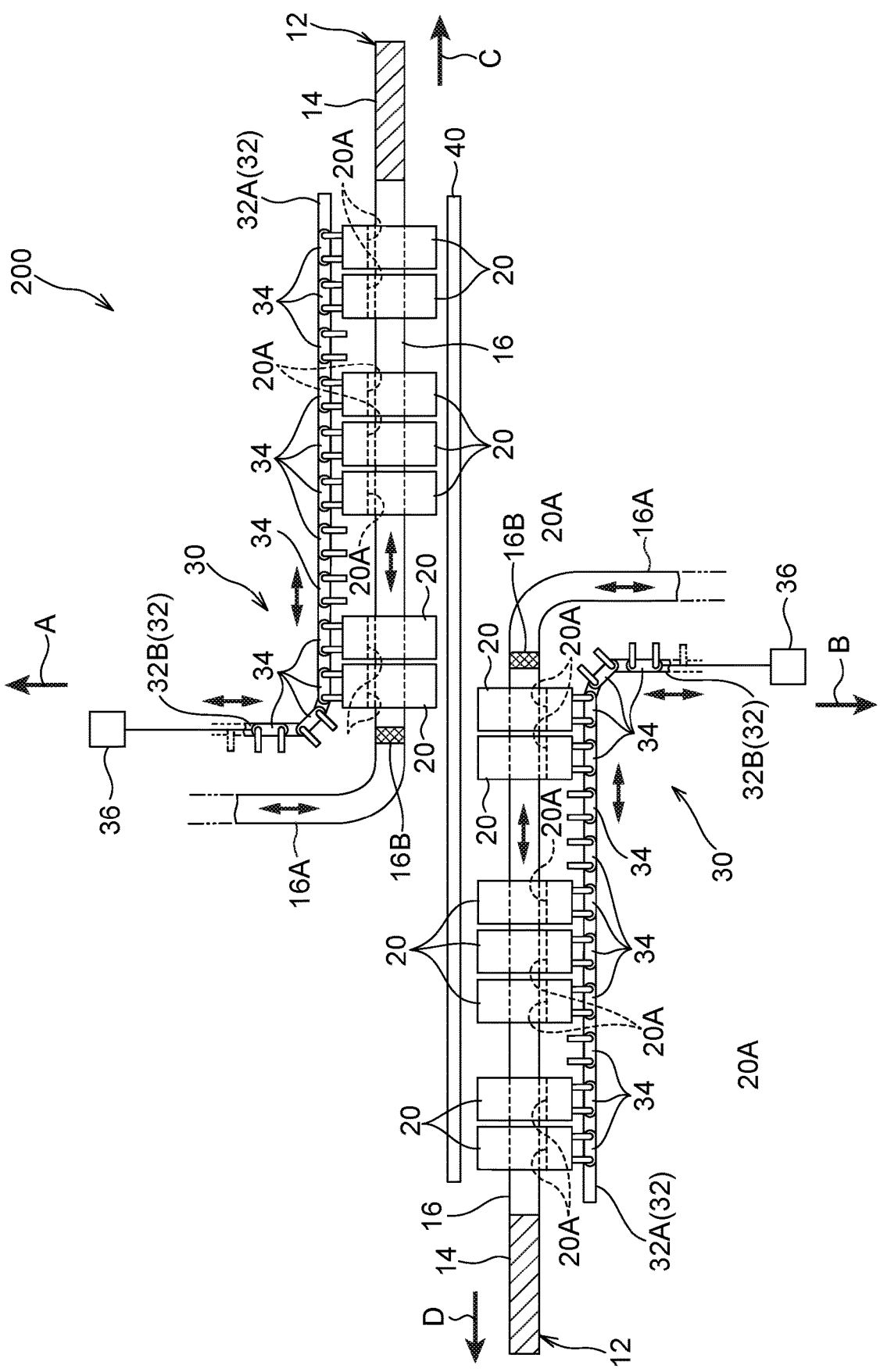
FIG. 15 is a schematic side view corresponding to FIG. 7, illustrating an induction heating device applied with magnetic cores 20 of a modified example.

Note that in the magnetic cores 20 of the first and second exemplary embodiments, the recesses 20A of the third and fourth exemplary embodiments are not formed in the magnetic cores 20. However, as illustrated in FIG. 15, configuration may be made in which the recesses 20A are formed in the first and second exemplary embodiments, and the straight portions 16 of the induction coils 12 are disposed within the recesses 20A. In such cases, the height dimension of the magnetic cores 20 may be set such that lower end portions (upper end portions) of the magnetic cores 20 disposed at the upper side (lower side) of the metal strip 40 project out toward the side of the metal strip 40 with respect to the straight portions 16. Note that FIG. 15 illustrates an example employing the induction heating device 200 of the second exemplary embodiment.

In the first to the fourth exemplary embodiments, the induction coils 12 are disposed on both strip thickness direction sides (at the upper side and the lower side) of the metal strip 40. However, configuration may be made in which the induction coils 12 are disposed at either the upper side or the lower side of the metal strip 40. For example, the induction coils 12 are formed in a substantially racetrack shape in plan view, and the length of the induction coils 12 is preset to a length corresponding to a metal strip 40 having a broad strip width. The induction coils 12 are configured so as to be incapable of moving, and the induction coils 12 are disposed in advance at positions corresponding to the metal strip 40 having a broad strip width. This thereby enables the induction coils 12 to accommodate metal strips 40 of different strip widths (narrow strip widths). Moreover, in such cases, the guide rails 32 of the moving mechanisms 30 extend in the strip width direction of the metal strip 40, similarly to the support member 402 of the fourth exemplary embodiment. Actuating the moving mechanisms 30 according to the strip width dimension of the metal strip 40 enables a number of the induction coils 12 corresponding to the strip width dimension of the metal strip 40 to be disposed at the specific position.

Figure 18A:
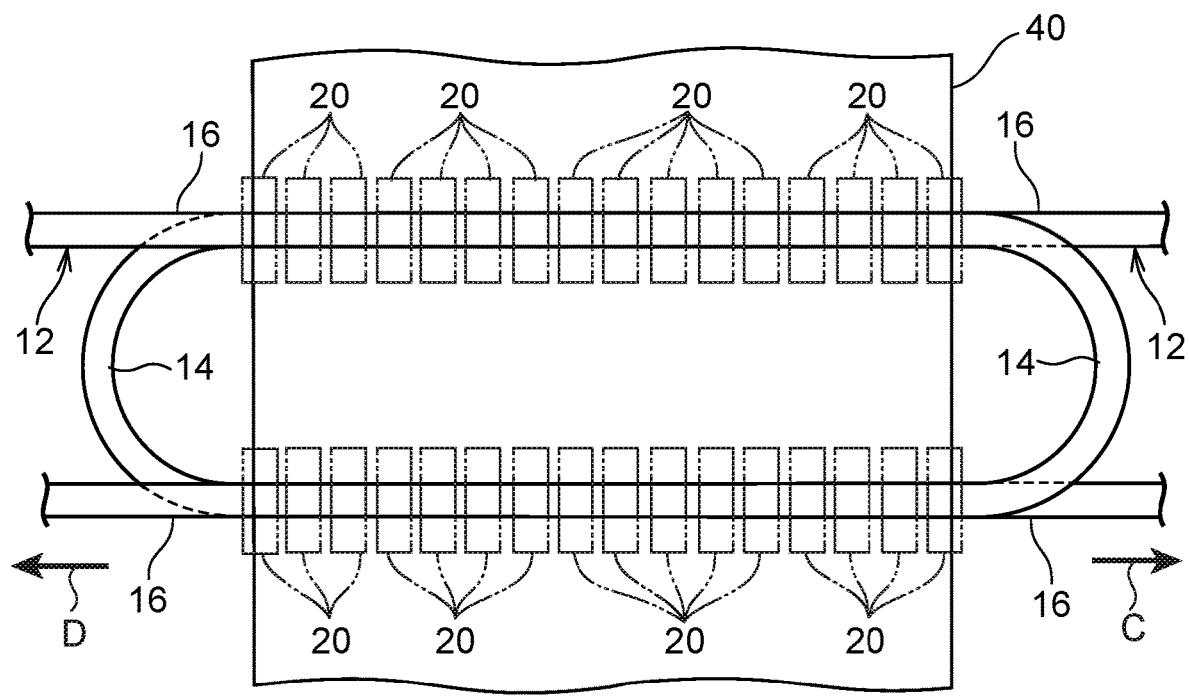
FIG. 18A is a plan view illustrating a modified example of placement positions of induction coils employed in a metal strip induction heating device of the first exemplary embodiment to the fourth exemplary embodiment.

In the first, third, and fourth exemplary embodiments, the curved portions 14 of the induction coils are disposed facing both width direction edge portions of the metal strip 40 in the strip thickness direction of the metal strip 40. Alternatively, as illustrated in FIG. 18A, the induction coils 12 may be placed at positions such that the curved portions 14 are disposed at width direction outsides of the metal strip 40, similarly to in the second exemplary embodiment. In such cases, configuration may be made such that the magnetic cores 20 are disposed spanning from one strip width direction edge portion to the other strip width direction edge portion of the metal strip 40 in plan view.

In the first to the fourth exemplary embodiments, the induction coils 12 (curved portions 14) are configured so as to be capable of moving in the strip width direction of the metal strip 40. However, the induction coils 12 may be configured so as to be incapable of moving. For example, the length of the induction coils 12 in the strip width direction of the metal strip 40 may be preset according to a metal strip 40 having a broad strip width, thereby enabling metal strips 40 with different strip widths (narrow strip widths) to be accommodated. In such cases, the magnetic cores 20 disposed at the specific position can be increased and decreased by actuating the moving mechanism 30 according to metal strips 40 of differing strip widths. This thereby enables the configuration of the induction heating device 10, 200, 300, 400 to be made simpler than in cases in which the induction heating device 10, 200, 300, 400 are configured with the induction coils 12 that are capable of moving.

Fifth Exemplary Embodiment

Figure 16:
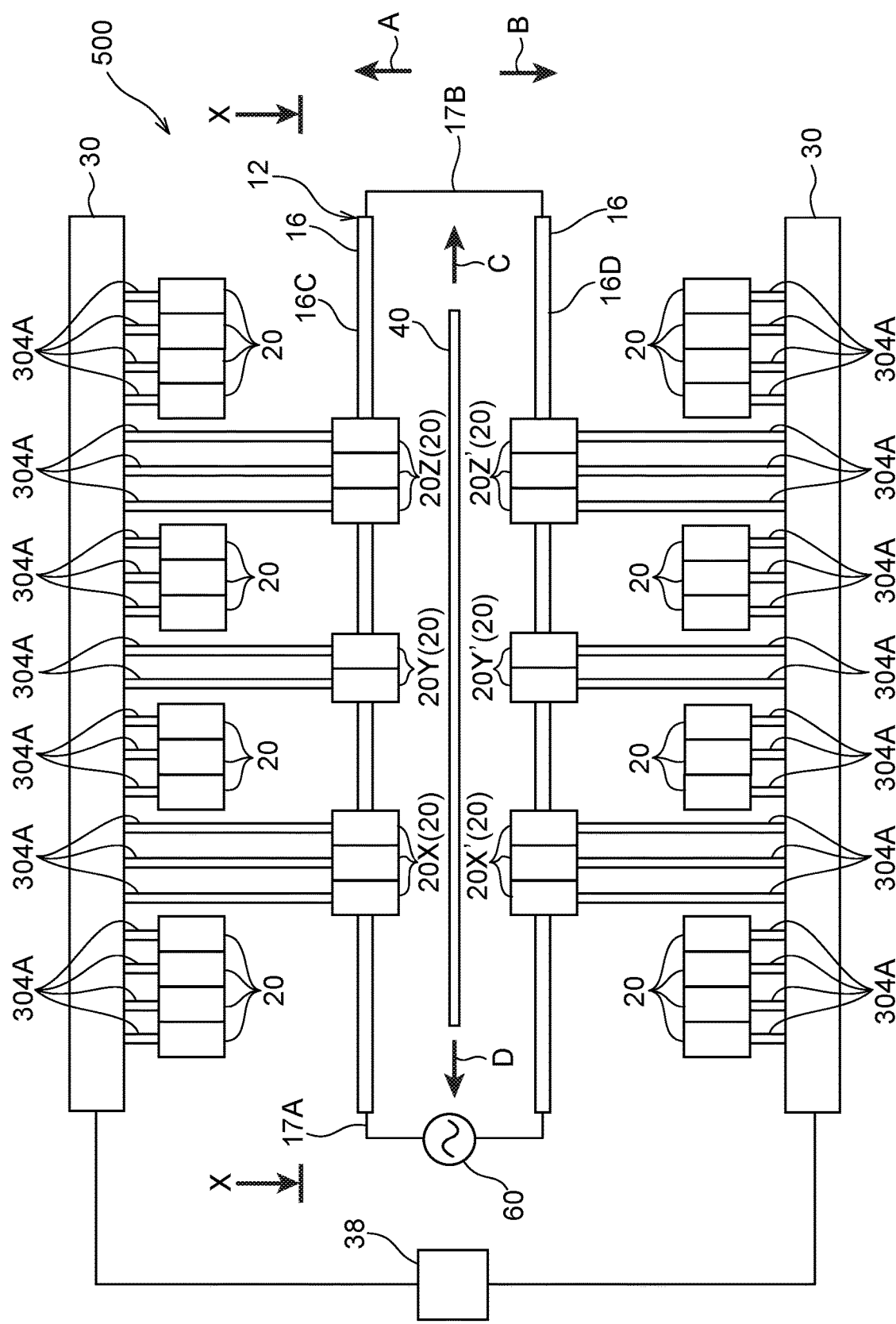
FIG. 16 is a front view as viewed from the length direction of a metal strip, illustrating relevant portions of a metal strip induction heating device of a fifth exemplary embodiment.
Figure 17:
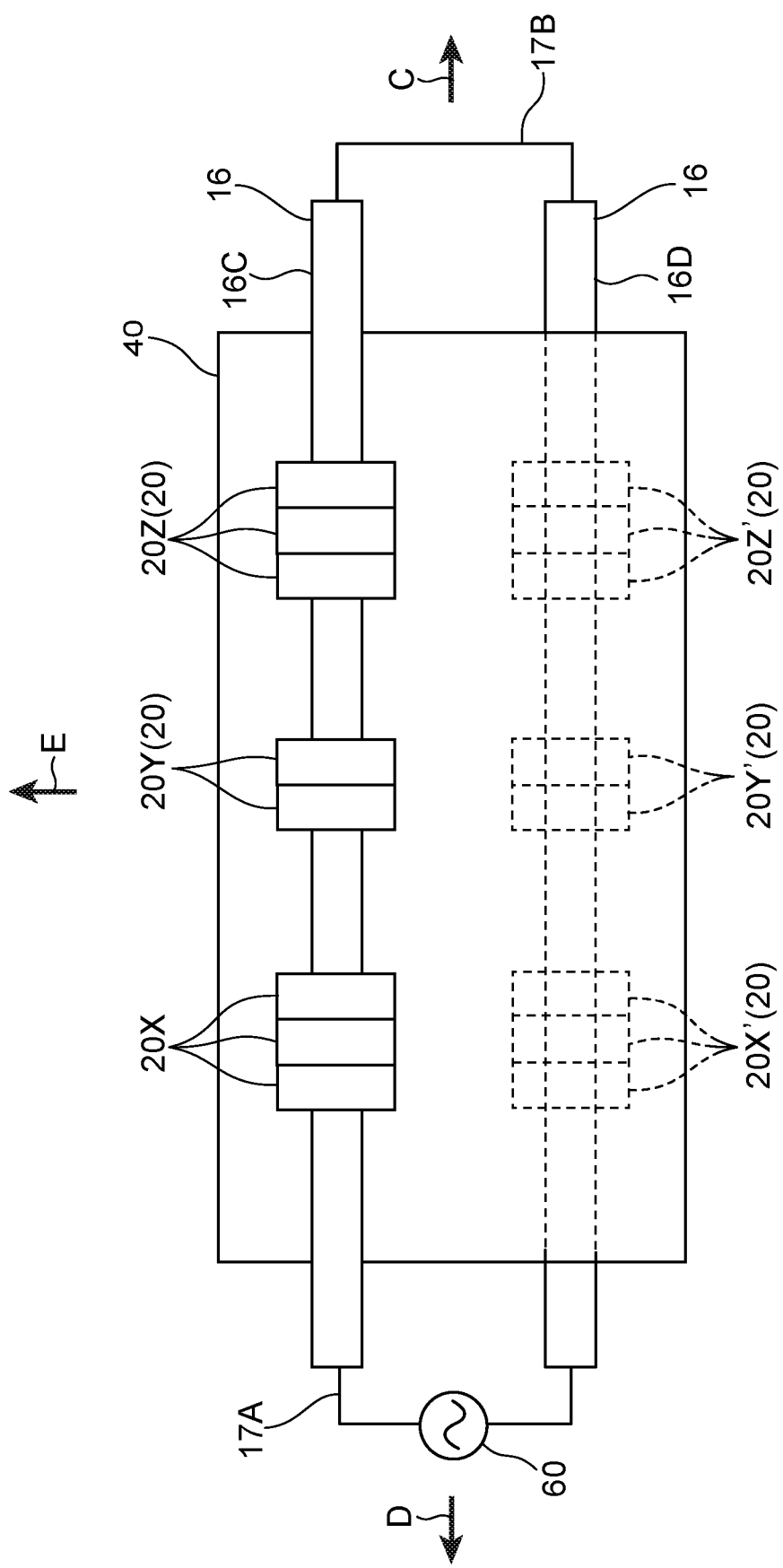
FIG. 17 is a view from the direction of arrow X in FIG. 16.

Explanation follows regarding an induction heating device 500 of a fifth exemplary embodiment, with reference to FIG. 16 and FIG. 17. The first exemplary embodiment to the fourth exemplary embodiment relate to a TF method, while the fifth exemplary embodiment relates to an oblique magnetic flux method in which the pair of the straight portions 16 of each induction coil 12 are provided on opposite sides to each other with respect to the strip faces of the metal strip 40. The induction heating device 500 of the fifth exemplary embodiment is configured similarly to the induction heating device 300 of the third exemplary embodiment, with the exception of the following points. Note that FIG. 16 is a side view as viewed from the conveyance direction of the metal strip 40, and illustrates relevant portions of the induction heating device 500. FIG. 17 is a view viewed from arrow X in FIG. 16.

In the third exemplary embodiment, the pair of straight portions 16 of each looped induction coil 12 are both provided on the same strip face side of the metal strip 40. However, in the fifth exemplary embodiment, one out of the pair of the straight portions 16 of a looped induction coil 12 (the straight portion 16 labeled 16C) is provided on the front face side of the metal strip 40 (on the arrow A direction side in FIG. 16), and the other out of the pair of straight portions 16 (the straight portion 16 labeled 16D) is provided on the reverse face side of the metal strip 40 (on the arrow B direction side in FIG. 16). The pair of straight portions 16 are provided so as to be offset to each other in the conveyance direction of the metal strip 40 (the arrow E direction in FIG. 17). Namely, the pair of straight portions 16 are provided so as not to line up in the conveyance direction of the metal strip 40 (the arrow E direction in FIG. 17) in plan view. The end portions of the pair of straight portions 16 on the one strip width direction side (the arrow C direction side) are connected together through a conductor line 17B, and the end portions of the pair of straight portions 16 on the other strip width direction side (the arrow D direction side) are connected together through a conductor line 17A. A high frequency power source 60 is provided partway along the conductor line 17A. The induction coil 12 is configured so as to be incapable of moving in the strip width direction of the metal strip 40, and the length of the pair of straight portions 16 in the strip width direction of the metal strip 40 is set such that a metal strip 40 having the maximum strip width that can be heated is able to be accommodated by the induction heating device 500.

In the case of the LF method described above, induction currents of the same size as each other flow in opposite directions to each other at the front and reverse faces of the metal strip 40. Accordingly, in cases in which the metal strip 40 is non-magnetic, or is a steel sheet that and loses its magnetism on exceeding its Curie temperature, the current permeation depths δ become deep and interfere with each other, and the induction currents stop flowing. However, in the fifth exemplary embodiment, the pair of straight portions 16 are provided offset to each other in the conveyance direction of the metal strip 40 (the arrow E direction in FIG. 17). Accordingly, since the respective currents only flow in one direction in a region of the metal strip 40 faced by the pair of straight portions 16, the currents flow without interference, even when the current permeation depth δ is deep.

Plural of the magnetic cores 20 are disposed on the respective opposite sides from the metal strip 40 with respect to the pair of straight portions 16 of the induction coil 12. Namely, the plural magnetic cores 20 are disposed at the respective back face sides of the pair of straight portions 16 as viewed from the length direction of the metal strip 40. The plural magnetic cores 20 provided on the front face side (arrow A direction side) of the metal strip 40 are respectively coupled to the moving mechanism 30 provided on the front face side (arrow A direction side). Configuration is made such that the plural magnetic cores 20 provided on the front face side of the metal strip 40 are moved independently of each other by the moving mechanism 30 by controlling the moving mechanism 30 with the controller 38, and are capable of moving in the up-down direction (the arrow A and B directions) and in the strip width direction of the metal strip 40 (the arrow C and D directions). The plural magnetic cores 20 provided on the reverse face side (arrow B side) of the metal strip 40 are respectively coupled to the moving mechanism 30 provided on the reverse face side (arrow B direction side). Configuration is made such that the plural magnetic cores 20 provided on the reverse face side of the metal strip 40 are moved independently of each other by the moving mechanism 30 by controlling the moving mechanism 30 with the controller 38, and are capable of moving in the up-down direction (the arrow A and B directions) and in the strip width direction of the metal strip 40 (the arrow C and D directions).

The magnetic cores 20 are moved in the up-down direction (the arrow A and B directions) between the specific position and the standby position by the moving mechanism 30. Note that the magnetic cores 20 may be disposed at either position of the specific position or the standby position, and may also be disposed at a position partway between the specific position and the standby position (an intermediate position). When the magnetic cores 20 are disposed at the specific position, similarly to in the third exemplary embodiment, the magnetic cores 20 are disposed at the back face of the straight portions 16 so as to straddle the straight portions 16 of the induction coil 12.

The disposed number of the plural magnetic cores 20 is set as a number capable of accommodating a metal strip 40 having the maximum strip width that can be heated by the induction heating device 500. Out of the plural magnetic cores 20, an appropriate number of the magnetic cores 20 at appropriate positions are pulled back (moved away) from the straight portion 16 of the induction coil 12 or moved in the strip width direction (the arrow C and D directions) by the moving mechanism 30 according to the strip width and meandering state of the metal strip 40. Note that the strip width and meandering state of the metal strip 40 may, for example, be detected by detecting both edge portions of the metal strip 40 in the strip width direction using the strip width/edge position detector 51 (see FIG. 1) that is provided with an image detector. The moving mechanism 30 is then controlled by the controller 38 according to the signals from the strip width/edge position detector 51 (see FIG. 1) to move the magnetic cores 20 in the up-down direction (the arrow A and B directions) and in the strip width direction of the metal strip 40 (the arrow C and D directions) as appropriate.

Note that when adjusting the temperature distribution in the strip width direction of the metal strip 40 (the arrow C and D directions) using the plural magnetic cores 20, the moving mechanism 30 may be controlled by the controller 38 according to signals from the temperature distribution detector 52 (see FIG. 1) to move the magnetic cores 20 in the up-down direction (the arrow A and B directions) and in the strip width direction of the metal strip 40 (the arrow C and D directions) as appropriate. The temperature distribution of the metal strip 40 may be controlled by the controller 38 without detecting the temperature distribution with the temperature distribution detector 52, based on information relating to the placement of the plural magnetic cores 20 and the temperature distribution found in advance through simulations. In such cases, the controller 38 controls the moving mechanism 30 to move the plural magnetic cores 20 based on the placement information for the plural magnetic cores 20 found in advance through simulations, and signals from the strip width/edge position detector 51.

In FIG. 16 and FIG. 17, magnetic cores 20Y (20Y') at a central portion in the strip width direction of the metal strip 40 (the arrow C and D directions), and magnetic cores 20X (20X'), 20Z (20Z') just inside both strip width direction (the arrow C and D directions) edges are disposed at the specific position. Out of the plural magnetic cores 20, the magnetic cores 20 other than the magnetic cores 20X (20X'), 20Y (20Y'), and 20Z (20Z') are disposed at the standby position. As described above, there is a tendency for a momentary decrease in the heating temperature of the metal strip 40 to occur at the portions of the metal strip 40 just inside both strip width direction edges of the metal strip 40. The magnetic cores 20X (20X'), 20Z (20Z') disposed at the specific position just inside both edges in the strip width direction (the arrow C and D directions) are capable of raising the temperature at these inside portions. Due to the above, the fifth exemplary embodiment also enables the disposed number of the magnetic cores 20 at the specific position disposed side-by-side along the strip width direction of the metal strip 40 to be increased or decreased according to the strip width dimension of the metal strip 40, and enables a more uniform heating temperature to be effectively achieved over the strip width direction of the metal strip 40.

Figure 18B:
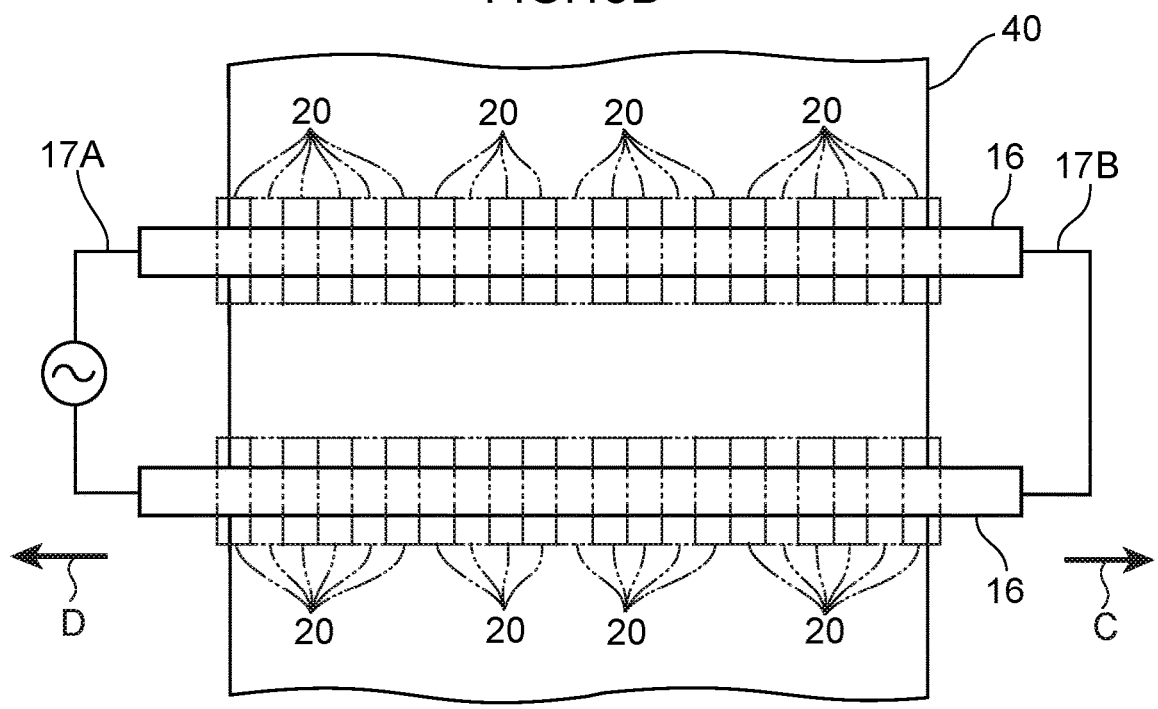
FIG. 18B is a plan view illustrating a modified example of an induction coil employed in a metal strip induction heating device of the first exemplary embodiment to the fourth exemplary embodiment.

Note that in the first exemplary embodiment to the fourth exemplary embodiment described above, each induction coil 12 is configured including the curved portion 14 and a pair of the straight portions 16. However, the induction coils 12 in the first to the fourth exemplary embodiments may be configured similarly to the fifth exemplary embodiment. Namely, as illustrated in FIG. 18B, each of the induction coils 12 of the first to the fourth exemplary embodiments may be configured from a pair of the straight portions 16, the conductor 17B connecting the pair of straight portions 16 together at end portions on the one strip width direction side, and the conductor 17A connecting the pair of straight portions 16 together at end portions on the other strip width direction side. Moreover, the pair of straight portions 16 may both be disposed on the same strip face side of the metal strip 40. In such cases, the induction coils 12 are configured so as to be incapable of moving in the strip width direction of the metal strip 40.

The disclosure of Japanese Patent Application No. 2014-179664, filed on Sep. 3, 2014, and the disclosure of Japanese Patent Application No. 2014-181692, filed on Sep. 5, 2014 are incorporated in their entirety by reference herein.

Supplementary Explanation (1) An induction heating device for a metal strip, the induction heating device including: an induction coil that is provided on one strip thickness direction side or on both strip thickness direction sides of a metal strip that travels along a length direction thereof, and that induces an induction current in the metal strip when a primary current is passed through the induction coil, the induction current configuring a closed loop as viewed from the strip thickness direction of the metal strip; plural magnetic cores that face the metal strip in the strip thickness direction and that are disposed at a specific position separated from the metal strip by a specific distance so as to concentrate magnetic flux generated by the induction coil; and a moving mechanism that is coupled to the magnetic cores, and that moves the magnetic cores so as to increase or decrease a disposed number of the magnetic cores at the specific position disposed side-by-side along a strip width direction of the metal strip.

(2) The metal strip induction heating device of (1), wherein the moving mechanism is configured including: a guide rail that is provided on a side that is opposite from the metal strip with respect to the induction coil, and that extends along the strip width direction of the metal strip; and a moving member that is provided at the guide rail so as to be capable of moving, that is coupled to the magnetic cores, and that is moved along a length direction of the guide rail so as to dispose the plural magnetic cores at the specific position in a state in which a spacing of the plural magnetic cores in the length direction of the guide rail is maintained.

(3) The metal strip induction heating device of (1), wherein the moving mechanism is configured including a guide rail that is provided on a side that is opposite from the metal strip with respect to the induction coil, and that extends along the strip width direction of the metal strip, and plural moving devices that are provided at the guide rail so as to be capable of moving, that are coupled to the plural respective magnetic cores, and that are moved along a length direction of the guide rail so as to dispose the magnetic cores at the specific position, and the plural moving devices are configured so as to be capable of moving independently of each other along the length direction of the guide rail.

(4) The metal strip induction heating device of (3), wherein the moving mechanism includes plural approach/separation devices that are respectively fixed to the plural moving devices, and that couple the moving devices and the magnetic cores together, and the plural approach/separation devices are configured so as to be capable of independently moving the respective magnetic cores toward the metal strip in the strip thickness direction of the metal strip.

(5) The metal strip induction heating device of (1), wherein the moving mechanism includes plural approach/separation devices that are respectively coupled to the magnetic cores, and the plural approach/separation devices are provided on a side that is opposite from the metal strip with respect to the magnetic cores, and are configured so as to be capable of independently moving the respective magnetic cores toward and away from the metal strip in the strip thickness direction of the metal strip, and the plural approach/separation devices are actuated so as to dispose the magnetic cores either at a standby position not contributing to concentrating magnetic flux generated by the induction coil, or at the specific position.

(6) The metal strip induction heating device of (5), wherein the approach/separation devices are configured so as to be capable of moving the magnetic cores to an intermediate position between the specific position and the standby position.

(7) The induction heating device of (5) or (6), wherein the moving mechanism includes plural moving devices respectively coupled to the plural approach/separation devices, and the plural moving devices are configured so as to be capable of independently moving the respective approach/separation devices in the strip width direction of the metal strip.

(8) The induction heating device of any one of (1) to (7), wherein a controller is connected to the moving mechanism, and the controller actuates the moving mechanism based on information of at least one out of a temperature distribution of the metal strip, or a profile of the metal strip in the strip width direction.

(9) The induction heating device of (8), wherein a temperature distribution detector that detects a temperature distribution of the metal strip and a strip width/edge position detector that detects the profile of the metal strip in the strip width direction are connected to the controller, and the controller actuates the moving mechanism based on at least one signal output to the controller from the temperature distribution detector or from the strip width/edge position detector.

An induction heating device for a metal strip of the present disclosure is an induction heating device wherein, at a same-face side or at both face side strip faces of a metal strip that travels along a length direction thereof, at the same strip face side, two or more conductor faces of an induction coil facing the strip face are formed separated by a distance. When a primary current is passed through the induction coil, magnetic flux penetrates the metal strip in the direction of travel without penetrating the metal strip in its thickness direction, inducing an induction current in a closed circuit in the strip face of the metal strip. Plural magnetic cores that move along the induction coil are disposed independently of the induction coil in the vicinity of a back face of the induction coil.

An induction heating device for a metal strip of the present disclosure, is an induction heating device wherein, conductor faces of an induction coil facing a strip face at one strip face out of front and reverse strip faces of a metal strip that travels along a length direction thereof are formed separated by a distance in a same plane, and conductor faces of the induction coil facing the other face out of the front and reverse strip faces of the metal strip are formed separated by a distance in a same plane. When a primary current is passed through the induction coil, magnetic flux is generated penetrating the metal strip in the strip thickness direction. Plural magnetic cores that move along the induction coil are disposed independently of the induction coil in the vicinity of back faces of the induction coil.

The invention claimed is:

1. An induction heating device for a metal strip, the induction heating device comprising:
    an induction coil that is provided on one side or on both sides out of a front face side or a reverse face side of a metal strip that travels along a length direction thereof, and that induces an induction current in the metal strip when a primary current is passed through the induction coil, the induction current configuring a closed loop as viewed from a direction perpendicular to a strip face of the metal strip;
    a plurality of magnetic cores disposed side-by-side along a strip width direction of the metal strip, wherein the magnetic cores are disposed on the side of the induction coil opposite the metal strip, and wherein the magnetic cores are separated from the metal strip by a distance such that the magnetic flux generated by the induction coil is concentrated in the metal strip by the magnetic cores;
    a moving mechanism that is coupled to the magnetic cores, and that moves the magnetic cores so as to increase a disposed number of the magnetic cores disposed side-by-side along the strip width direction of the metal strip, and so as to decrease a disposed number of the magnetic cores disposed side-by-side along the strip width direction of the metal strip by moving at least one magnetic core to a standby position not contributing to concentrating magnetic flux generated by the induction coil; and
    a controller including circuitry that is configured to actuate the moving mechanism to increase or decrease the disposed number of the magnetic cores at the specific position based on a width of the metal strip or a temperature distribution of the metal strip.

2. The metal strip induction heating device of claim 1, wherein the moving mechanism is configured including:
    a guide rail that is provided on a side that is opposite from the metal strip with respect to the induction coil, and that extends along the strip width direction of the metal strip; and
    a moving member that is provided at the guide rail so as to be capable of moving, that is coupled to the magnetic cores, and that is moved along a length direction of the guide rail so as to dispose the plurality of magnetic cores at the specific position in a state in which a spacing of the plurality of magnetic cores in the length direction of the guide rail is maintained.

3. The metal strip induction heating device of claim 1, wherein
    the moving mechanism is configured including:
        a guide rail that is provided on a side that is opposite from the metal strip with respect to the induction coil, and that extends along the strip width direction of the metal strip; and
        a plurality of moving devices that are provided at the guide rail so as to be capable of moving, that are coupled to the plurality of respective magnetic cores, and that are moved along a length direction of the guide rail so as to dispose the magnetic cores at the specific position, and
    the plurality of moving devices are configured so as to be capable of moving independently of each other along the length direction of the guide rail.

4. The metal strip induction heating device of claim 1, wherein
    the moving mechanism includes a plurality of approach/separation devices that are respectively fixed to the plurality of moving devices, and that couple the moving devices and the magnetic cores together, and
    the plurality of approach/separation devices are configured so as to be capable of independently moving the respective magnetic cores toward the metal strip in the strip thickness direction of the metal strip.

5. The metal strip induction heating device of claim 1, wherein the moving mechanism includes a plurality of approach/separation devices that are respectively coupled to the magnetic cores,
    the plurality of approach/separation devices are provided on a side that is opposite from the metal strip with respect to the magnetic cores, and are configured so as to be capable of independently moving the respective magnetic cores toward and away from the metal strip in the strip thickness direction of the metal strip, and the plurality of approach/separation devices are actuated so as to dispose the magnetic cores either at a standby position not contributing to concentrating magnetic flux generated by the induction coil, or at the specific position.

6. The induction heating device of claim 5, wherein the moving mechanism includes a plurality of moving devices respectively coupled to the plurality of approach/separation devices, and the plurality of moving devices are configured so as to be capable of independently moving the respective approach/separation devices in the strip width direction of the metal strip.

7. The induction heating device of claim 1, wherein a controller is connected to the moving mechanism, and the controller actuates the moving mechanism based on information of at least one out of a temperature distribution of the metal strip, or a profile of the metal strip in the strip width direction.

8. The induction heating device of claim 7, wherein a temperature distribution detector that detects a temperature distribution of the metal strip and a strip width/edge position detector that detects the profile of the metal strip in the strip width direction are connected to the controller, and the controller actuates the moving mechanism based on at least one signal output to the controller from the temperature distribution detector or from the strip width/edge position detector.

* * * * *